(12) United States Patent
Lunneborg et al.

(10) Patent No.: US 7,573,009 B2
(45) Date of Patent: Aug. 11, 2009

(54) CONTROLLED MAGNETIC HEAT GENERATION

(75) Inventors: Timothy W. Lunneborg, Wahpeton, ND (US); Paul Gene Dimmer, Wahpeton, ND (US); Kevin Loll, Wahpeton, ND (US); James Ronald Thomas, Battle Lake, MN (US); Neil Howard Thomas, Brookings, SD (US); David M. Browning, Portland, OR (US)

(73) Assignee: MagTec Energy, LLC, Fargo, ND (US)

( * ) Notice: Subject to any disclaimer, the term of this patent is extended or adjusted under 35 U.S.C. 154(b) by 458 days.

(21) Appl. No.: 10/821,295

(22) Filed: Apr. 9, 2004

(65) Prior Publication Data

US 2005/0006381 A1    Jan. 13, 2005

Related U.S. Application Data

(63) Continuation-in-part of application No. 10/269,690, filed on Oct. 11, 2002, now abandoned, which is a continuation of application No. PCT/US02/23569, filed on Jul. 23, 2002.

(60) Provisional application No. 60/307,409, filed on Jul. 24, 2001.

(51) Int. Cl.
*H05B 6/10* (2006.01)
(52) U.S. Cl. ............................. 219/628; 219/631
(58) Field of Classification Search ................ 219/628, 219/629, 630, 631, 601, 600
See application file for complete search history.

(56) References Cited

U.S. PATENT DOCUMENTS

| 2,566,274 A | 8/1951 | White et al. |
| 3,014,116 A | 12/1961 | MacArthur |

(Continued)

FOREIGN PATENT DOCUMENTS

| GB | 2119609 | 11/1983 |

(Continued)

OTHER PUBLICATIONS

Restriction Requirement mailed Dec. 30, 2005, for related U.S. Appl. No. 11/174,316.

(Continued)

*Primary Examiner*—Daniel L Robinson
(74) *Attorney, Agent, or Firm*—Silicon Forest Patent Group; Paul J Fordenbacher, Esq.

(57) ABSTRACT

A magnetic heater is provided having a conductive member and a first magnet assembly comprising a frame and at least one magnet disposed a distance adjacent the conductive member, wherein the first magnet assembly and the first frame are adapted to rotate relative to each other about an axis so as to induce eddy currents in the conductive member when relative motion is produced between the conductive member and the first magnet assembly, the at least one magnet adapted to move relative to the frame in dependence on the change in the rate of rotation of the frame. The magnetic heater is provided with a passive relative-positioning actuator adapted to move one or more magnets in an axial direction and a radial direction relative to the frame. Such movement is exploited to control the magnetic field strength at the conductive member by controlling, among other things, the conductor/magnet spacing.

14 Claims, 24 Drawing Sheets

U.S. PATENT DOCUMENTS

| | | | |
|---|---|---|---|
| 3,534,197 | A | 10/1970 | Burnett |
| 4,145,591 | A | 3/1979 | Takeda |
| 4,421,967 | A | 12/1983 | Birgel et al. |
| 4,471,191 | A | 9/1984 | Greis et al. |
| 4,486,638 | A | 12/1984 | de Bennetot |
| 4,503,305 | A | 3/1985 | Virgin |
| 4,600,821 | A | 7/1986 | Fichtner et al. |
| 4,614,853 | A | 9/1986 | Gerard et al. |
| 4,635,705 | A * | 1/1987 | Kuznetsov ............ 164/466 |
| 5,012,060 | A | 4/1991 | Gerard et al. |
| 5,237,144 | A | 8/1993 | Iguchi |
| 5,263,920 | A | 11/1993 | Budza et al. |
| 5,286,942 | A | 2/1994 | McFadden et al. |
| 5,773,798 | A | 6/1998 | Fukumura |
| 5,870,660 | A | 2/1999 | Ito et al. |
| 5,914,065 | A | 6/1999 | Alavi |
| 5,994,681 | A * | 11/1999 | Lloyd .................... 219/631 |
| 6,011,245 | A * | 1/2000 | Bell ....................... 219/631 |
| 6,144,020 | A | 11/2000 | Usui et al. |
| 6,147,336 | A | 11/2000 | Ushijima et al. |
| 6,297,484 | B1 * | 10/2001 | Usui et al. .............. 219/631 |
| 6,489,598 | B1 | 12/2002 | Hielm |
| 6,717,118 | B2 | 4/2004 | Pilavdzic et al. |
| 6,969,833 | B2 | 11/2005 | Suzuki |
| 7,009,158 | B2 | 3/2006 | Sekiguchi et al. |
| 2003/0066830 | A1 * | 4/2003 | Reed et al. ............. 219/672 |

FOREIGN PATENT DOCUMENTS

| | | |
|---|---|---|
| TW | 399829 | 7/2000 |
| WO | PCT/US02/23569 | 7/2002 |

OTHER PUBLICATIONS

Response to Restriction Requirement filed Jan. 30, 2006, for related U.S. Appl. No. 11/174,316.
Supplemental Response to Restriction Requirement filed Mar. 2, 2006, for related U.S. Appl. No. 11/174,316.
Non-Final Office action mailed May 16, 2006, for related U.S. Appl. No. 11/174,316.
Response filed Aug. 15, 2006, for related U.S. Appl. No. 11/174,316.
Notice of Allowance mailed Mar. 8, 2007, for related U.S. Appl. No. 11/174,316.
Notice of Withdraw from Issue, mailed Mar. 16, 2007, for related U.S. Appl. No. 11/174,316.
Non-Final Office action, mailed May 30, 2007, for related U.S. Appl. No. 11/174,316.
Response filed Aug. 30, 2006, for related U.S. Appl. No. 11/174,316.
Restriction Requirement mailed Nov. 17, 2006, for related U.S. Appl. No. 11/243,394.
Response to Restriction Requirement filed Dec. 18, 2006, for related U.S. Appl. No. 11/243,394.
International Preliminary Examination Report for related application PCT/US02/23569, mailed Nov. 20, 2003.
Written Opinion for related application PCT/US02/23569, mailed Apr. 9, 2003.
Response to Written Opinion for related application PCT/US02/23569, filed Jul. 23, 2008.
U.S. Appl. No. 10/269,690, filed Oct. 3, 2002, Reed et al.
U.S. Appl. No. 60/307,409, filed Jul. 24, 2001, Reed et al.

* cited by examiner

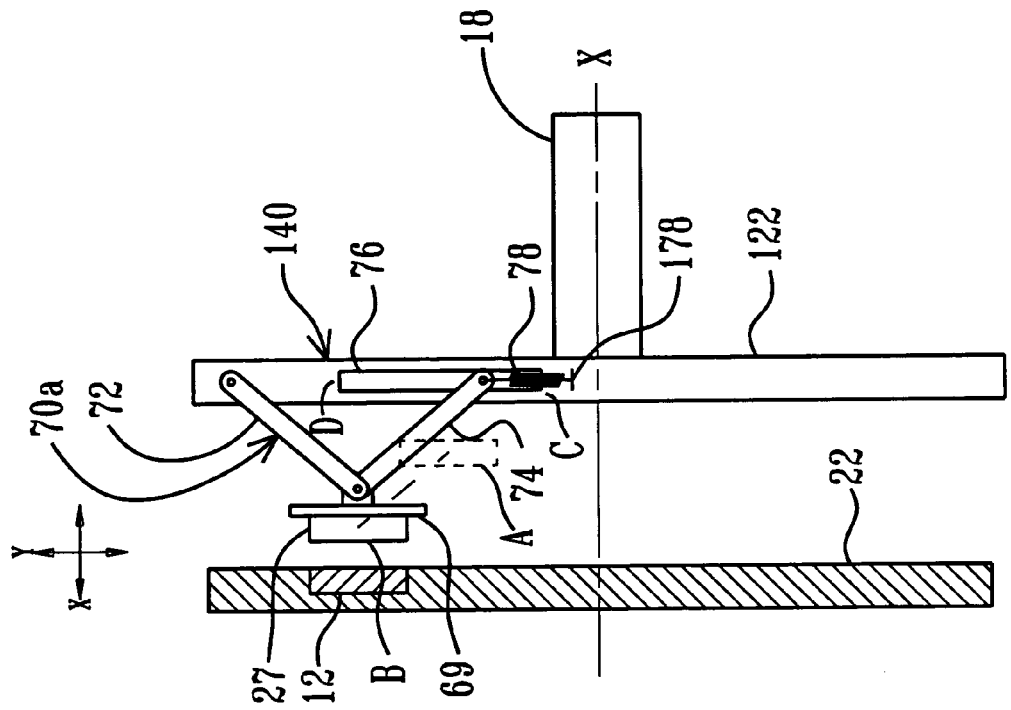
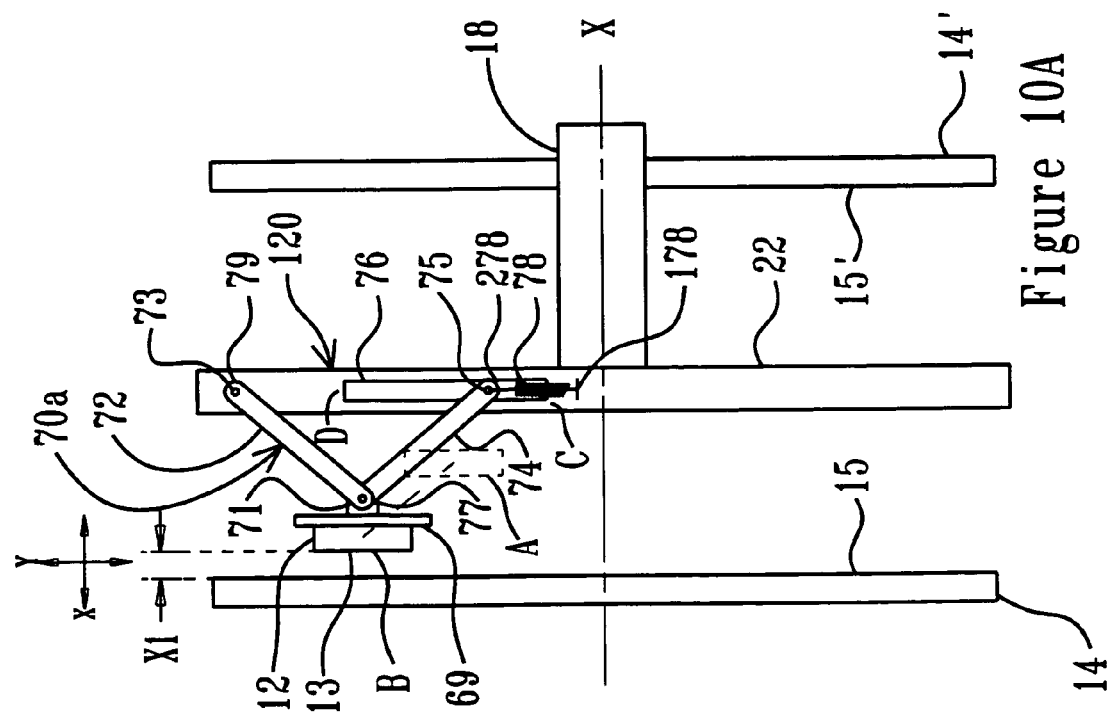
Figure 10B
Figure 10A

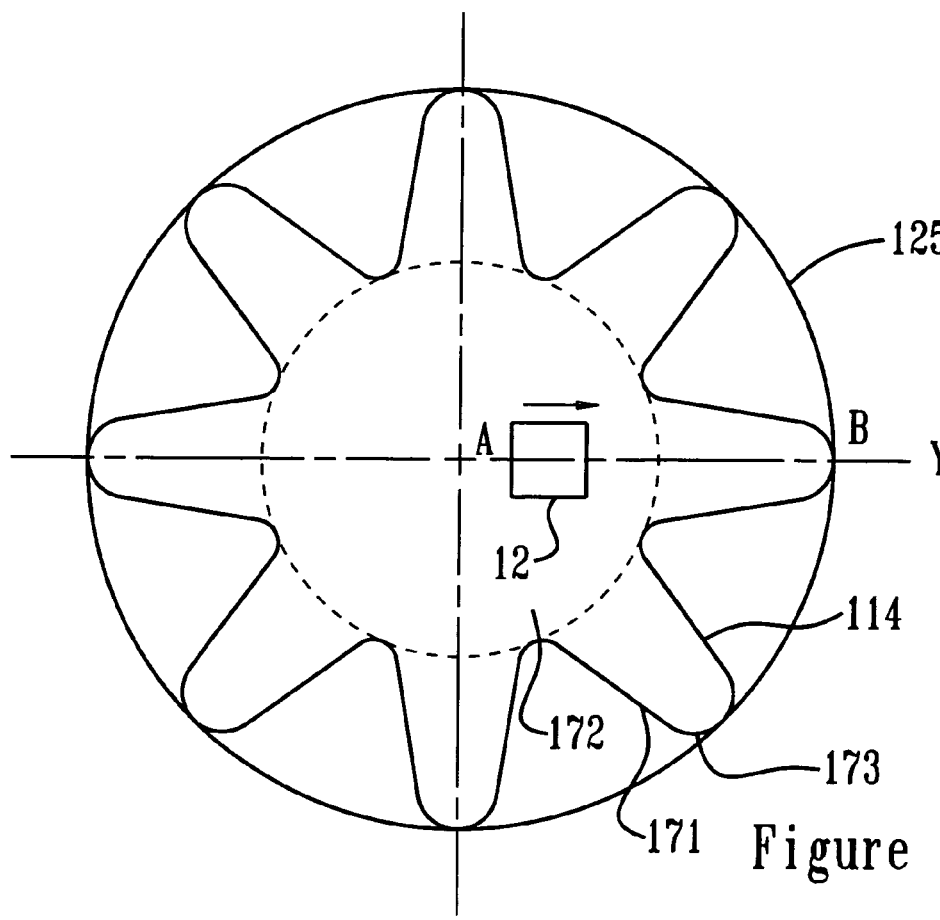
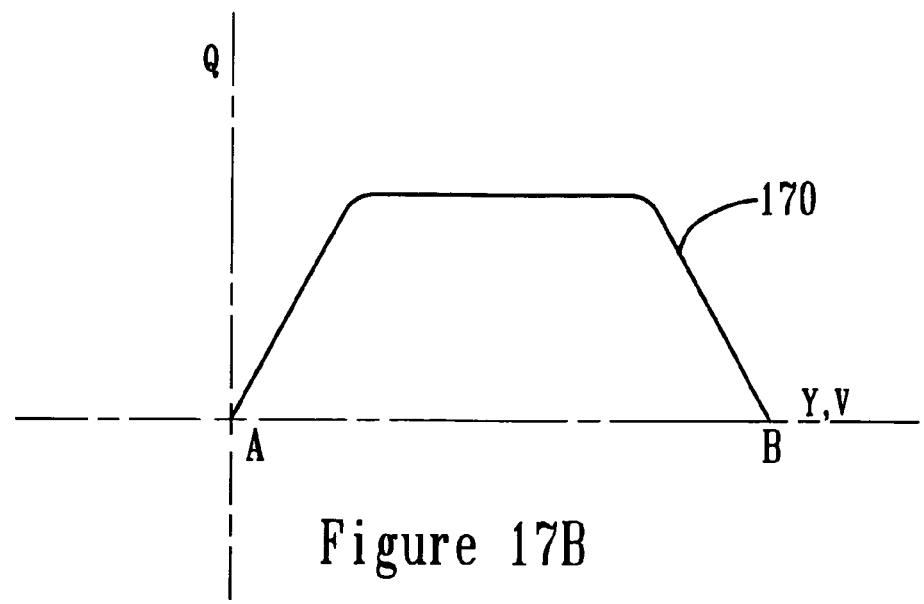
Figure 17A
Figure 17B

CONTROLLED MAGNETIC HEAT GENERATION

RELATED APPLICATIONS

This is a continuation-in-part application claiming benefit under 35 USC § 120 of U.S. application Ser. No. 10/269,690, filed Oct. 11, 2002 now abandoned and entitled MAGNETIC HEATER APPARATUS AND METHOD, which is in its entirety incorporated herewith by reference; claiming priority to Continuation application No. PCT/US02/23569, filed on Jul. 23, 2002, which is in its entirety incorporated herewith by reference; claiming priority to Provisional application No. 60/307,409, filed on Jul. 24, 2001, which is in its entirety incorporated herewith by reference.

FIELD OF THE INVENTION

The present invention is related to devices for the production of heat, and more particularly, to methods and apparatus for generating heat using magnetic induction.

BACKGROUND

A magnetic heater generates heat by a phenomenon known as magnetic inductive heating. Magnetic inductive heating occurs in an electrically conductive member when exposed to a time-varying magnetic field. The varying magnetic field induces eddy currents within the conductive member, thereby heating it. An increase in the magnitude of the variations of the magnetic field increases the rate at which the conductive member is heated. The heated conductive member can then be used as a heat source for various purposes. The heated conductive member is often used to heat a fluid, such as air or water, that is circulated past the conductive member. The heated fluid is then used to transfer the heat from the heater for external use.

One method of exposing a conductive member to a varying magnetic field is to move a magnetic field source relative to the conductive member. This motion may be achieved by arranging magnets around the edge of a circular disk having a rotatable shaft substantially at its center, the flat surface of the disk being opposable to an essentially flat portion of the surface of the conductive member. As the shaft of the disk is rotated, the magnets move relative to the surface of the conductive member. A given point on the conductive member is exposed to a cyclically varying magnetic field as each of the magnets approach, pass over, and retreat from that given point.

The amount of heat induced within the conductive member depends on many factors, some of which include the strength of the magnetic field, the distance between the magnets and the conductive member (referred herein as the "conductor/magnet spacing"), and the relative speed of the magnets to the conductive member.

Conventional magnetic heaters suffer from several disadvantages. For example, many conventional magnetic heaters have limited precision in their control of operational parameters such as the rate of heat generation, the flow rate of a working fluid used to carry heat, and the temperature of that working fluid. In particular, it is difficult to control these and other operational parameters independently from one another with conventional magnetic heaters.

For a given conductor/magnet spacing and a given magnetic field strength, increasing the disk rotation speed increases the rate of cyclical variation of the magnetic field at a given point on the conductive member, thus increasing the heating of the conductive member. Therefore, in order to be able to vary the heating of the conductive member, and thus have a range of heat output from the heater, the rotation speed of the disk must be variably controlled. For example, if a motor is used as the energy source driving the shaft to rotate the disk, the motor speed must be variable in order to vary the heating of the conductive member. If a windmill is used as an energy source, it may be very difficult to selectively change the rotation speed of the disk.

In order to produce a constant heat output from the heater, a constant rotation speed of the disk must be maintained. If an internal combustion engine is used as the energy source driving the shaft to rotate the disk, the engine must be throttleable to produce a constant output at a given tachometer setting, in order to induce a constant heating of the conductive member. A power takeoff from a vehicle engine, such as a tractor engine, commonly has a constant speed of rotation for a given throttle setting. Although it is possible to change the heat output by varying the engine speed, doing so may effect the vehicle in undesirable ways. If a windmill is used as an energy source to rotate the disk, it is very difficult to produce a constant rotation speed of the disk.

Some magnetic heaters utilize a rotating disk designed with a preferential shape to provide the driving force for circulating heat-transfer fluid. Alternatively, the shaft is used to drive a fluid pump. Consequently, the fluid flow rate is directly determined by the rotation speed of the shaft. Driving the fluid in this manner makes it difficult to control the temperature of the fluid exiting the magnetic heater. As the shaft speed is increased in order to increase the heating of the conductive member, the flow rate of the fluid is consequently also increased, which, in-turn, works against obtaining a desired fluid temperature for a given flow rate.

Although it is possible to address the difficulty of controlling fluid flow and/or fluid temperature by driving the fluid with a mechanism separate from that used to rotate the disk, reliance on such an additional mechanism tends to increase the size, weight, and complexity of the magnetic heater.

The disadvantages of limited control of operational parameters impact the usefulness of the magnetic heater. For example, many types of grain are routinely dried after harvesting by exposure to a flow of heated air. The appropriate temperature to which the air should be heated and the preferred rate of air flow depend on many variables, such as the amount of moisture in the grain, the type of grain being dried, and the quantity of grain present. A conventional magnetic heater that cannot reliably maintain operating parameters at their desired levels, or that cannot readily be adjusted to reach those desired levels, is of limited use in drying the grain.

Therefore, a magnetic heater is needed that facilitates control over various parameters, in combination or individually.

SUMMARY

In an embodiment in accordance with the present invention, a magnetic heater comprises a conductive member having a conductive member first side and a conductive member second side, and a first magnet assembly comprising a first frame and at least one magnet movably coupled to the first frame, the at least one magnet disposed a first distance adjacent the conductive member first side, wherein the first magnet assembly and the first frame are adapted to rotate relative to each other about an axis so as to induce eddy currents in the conductive member when relative motion is produced between the first magnet assembly and the first frame, the at least one magnet adapted to move relative to the first frame in dependence on the change in the rate of rotation of the first frame.

In another embodiment in accordance with the present invention, the first magnet assembly further comprises at least one passive relative-positioning actuator adapted to move one or more magnets in at least one of an axial direction and a radial direction relative to the frame.

In another embodiment in accordance with the present invention, a the first frame further comprises a linkage guide, the passive relative-positioning actuator comprising a pivot mount adapted to couple with one or more magnets, a bias member having a bias member first end and a bias member second end, a first linkage arm having first linkage-arm first-end pivotally coupled to the frame distal from the axis and a first linkage-arm second-end pivotally coupled to the pivot mount, a second linkage arm having a second linkage-arm first-end coupled in sliding and pivoting engagement with the linkage guide and coupled to the bias member second end, and a second linkage-arm second-end pivotally coupled to the pivot mount, the linkage guide adapted to guide and restrict the second linkage-arm second-end to movement in a substantially radial direction, the bias member first end coupled to the frame preferentially positioned to apply bias when the bias member second-end is moved in a radial direction away from the axis, wherein the pivot mount moves relative to the frame when the frame is rotated at a changing rate of rotation.

In another embodiment in accordance with the present invention, the frame further comprising a linkage guide, the passive relative-positioning actuator comprising a pivot mount adapted to couple with one or more magnets, a bias member having a bias member first end and a bias member second end, a first linkage arm having first linkage-arm first-end coupled in sliding and pivoting engagement with the linkage guide and coupled to the bias member second end, and a first linkage-arm second-end pivotally coupled to the pivot mount, a second linkage arm having a second linkage-arm first-end pivotally coupled to the frame proximate to the axis, and a second linkage-arm second-end pivotally coupled to the pivot mount, the linkage guide adapted to guide and restrict the first linkage-arm first-end to movement in a substantially radial direction, the bias member first end coupled to the frame preferentially positioned to apply bias when the bias member second-end is moved in a radial direction away from the axis, wherein the pivot mount moves relative to the first frame when the first frame is rotated at a changing rate of rotation.

In another embodiment in accordance with the present invention, the passive relative-positioning actuator comprises a pivot mount adapted to couple with one or more magnets, a bias member having a bias member first end and a bias member second end, a pivot arm having pivot-arm first-end coupled in pivoting engagement with the first frame distal from the axis, and a pivot-arm second-end pivotally coupled to the pivot mount and coupled to the bias member second end, the bias member first end coupled to the frame preferentially positioned to apply bias when the bias member second-end is moved in a radial direction away from the axis, wherein the pivot mount moves relative to the first frame when the first frame is rotated at a changing rate of rotation.

In another embodiment in accordance with the present invention, the passive relative-positioning actuator comprising a bimetallic spring, wherein the first frame comprises one or more slots, each defining an axial-facing tang, the tang adapted to couple with at least one magnet, the tang comprising a first material having a first coefficient of thermal expansion and a second material having a second coefficient of thermal expansion to form a bimetallic spring, wherein as the temperature of the bimetallic spring rises, the bimetallic spring causes the tang to deflect in a preferred direction relative to the conductive member.

In another embodiment in accordance with the present invention, the first frame further comprises a pin guide, the passive relative-positioning actuator comprising a mount adapted to couple with one or more magnets, a guide pin coupled to the mount, and a bias member having a bias member first-end and a bias member second-end, the pin guide adapted to slidingly receive the guide pin and restrict movement of the guide pin to a substantially radial, the bias member first-end is coupled to the frame proximate the axis, and the bias member second-end is coupled to the mount.

In another embodiment in accordance with the present invention, the conductive member is disc shaped.

In another embodiment in accordance with the present invention, the conductive member comprises a substantially disc-shaped center portion and a plurality of arms extending from the center portion.

In another embodiment in accordance with the present invention, the conductive member comprises a plurality of conductive portions separated by non-conductive portions.

In another embodiment in accordance with the present invention, the conductive member comprises a plurality of nested rings separated by non-conductive portions.

In another embodiment in accordance with the present invention, the magnetic heater further comprises a second magnet assembly comprising a second frame and at least one magnet movably coupled to the second frame, the at least one magnet disposed a second distance adjacent the conductive member first side, wherein the second magnet assembly and the second frame are adapted to rotate relative to each other about an axis so as to induce eddy currents in the conductive member when relative motion is produced between the second magnet assembly and the second frame, the at least one magnet adapted to move relative to the second frame in dependence with the rate of rotation of the second frame.

In another embodiment in accordance with the present invention, a magnetic heater, comprises a magnet assembly having a magnet assembly first side and a magnet assembly second side, the magnet assembly comprising at least one magnet, and a first conductive member assembly comprising a first frame and at least one conductor movably coupled to the first frame, the at least one conductor disposed a first distance adjacent the magnetic assembly first side, wherein the first conductive member assembly and the first frame are adapted to rotate relative to each other about an axis so as to induce eddy currents in the at least one conductor when relative motion is produced between the magnet assembly and the first frame, the at least one conductor adapted to move relative to the first frame in dependence with the rate of rotation of the first frame.

In another embodiment in accordance with the present invention, the first conductive member assembly further comprises at least one passive relative-positioning actuator adapted to move one or more conductors in at least one of an axial direction and a radial direction relative to the frame.

In another embodiment in accordance with the present invention, a method of generating heat, comprises disposing at least one magnet on a first and second frame proximate each of a first and second side, respectively, of at least one conductive member, cyclically varying a magnetic field applied by the at least one magnet on at least a portion of the conductive member so as to heat the conductive member thereby, and passively adjusting a rate of heat generation in the conductive member while the conductive member is being heated by the at least one magnet, wherein each of the at least one magnet is adapted to move relative to the first and second frame in dependence on the rate of rotation of the first an second frame.

In another embodiment in accordance with the present invention, a magnetic heater apparatus comprises a rear housing, a first end plate, a heater housing, a magnetic heater, a second end plate, and a blower housing. The magnetic heater comprises a shaft, a first magnet assembly, a conductive member, a second magnet assembly, and a fluid driver. The first and second magnet assemblies having a plurality of magnets, the conductive member disposed between and coaxial with the first and second magnet assemblies, the conductive member coupled with the shaft and adapted to rotate with respect to the first and second magnet assemblies, the shaft adapted to couple with an energy source, the rear housing coupled adjacent the first end plate and comprising apertures adapted to accept the shaft there through, the first end plate coupled adjacent the heater housing defining a volume adapted to contain the first and second magnet assemblies and conductive member, the second end plate coupled adjacent the heater housing defining a side of the volume, the heater housing comprises a fluid outlet, the second end plate comprises a second end plate aperture defining a portion of a fluid path, the fluid driver coupled to the shaft and located adjacent the second end panel on the opposite side from the second magnet assembly, the blower housing coupled adjacent the second end panel adapted to enclose the fluid driver there between, the blower housing defining a fluid inlet aperture defining a portion of the fluid path, the fluid path defined by the fluid inlet aperture, the fluid driver, the second end plate aperture, the heater housing and the fluid outlet.

In another embodiment in accordance with the present invention, the magnetic heater apparatus further comprises a spacing adjustment assembly comprising a knob a threaded spacer having a first spacer end and a second spacer end a first retention coupler, and a second retention coupler, the first retention coupler disposed adjacent the first magnet assembly and the second retention coupler disposed adjacent the second magnet assembly, the threaded spacer disposed between the first and second magnet assemblies, the first spacer end coupled with the first retention coupler, the second spacer end disposed through the second retention coupler and coupled to the knob, wherein turning the knob in a first direction reduces the spacing between the first and second magnet assemblies and turning the knob in an opposite direction increases the spacing between the first and second magnet assemblies.

In another embodiment in accordance with the present invention, the first and second magnet assemblies further comprises a frame, and at least one passive relative-positioning actuator adapted to move one or more magnets in at least one of an axial direction and a radial direction relative to the frame, wherein the relative motion is produced in dependence on the change in the rate of rotation of the frame.

BRIEF DESCRIPTION OF THE DRAWINGS

Like reference numbers generally indicate corresponding elements in the figures.

FIG. 10A is a side view of a rotatable magnet assembly comprising a linkage-arm apparatus, in accordance with an embodiment of the present invention;

FIG. 10B is a side view of a conductive member assembly comprising a linkage-arm apparatus, in accordance with an embodiment of the present invention.

FIG. 17A is a front view of a radially moving magnet relative to a conductive member, in accordance with an embodiment of the present invention;

FIG. 17B is a graph showing a temperature curve illustrating the trend in the temperature generated in the conductive member with the change in radial position of the magnet, in accordance with an embodiment of the present invention;

DETAILED DESCRIPTION

Figure 1:
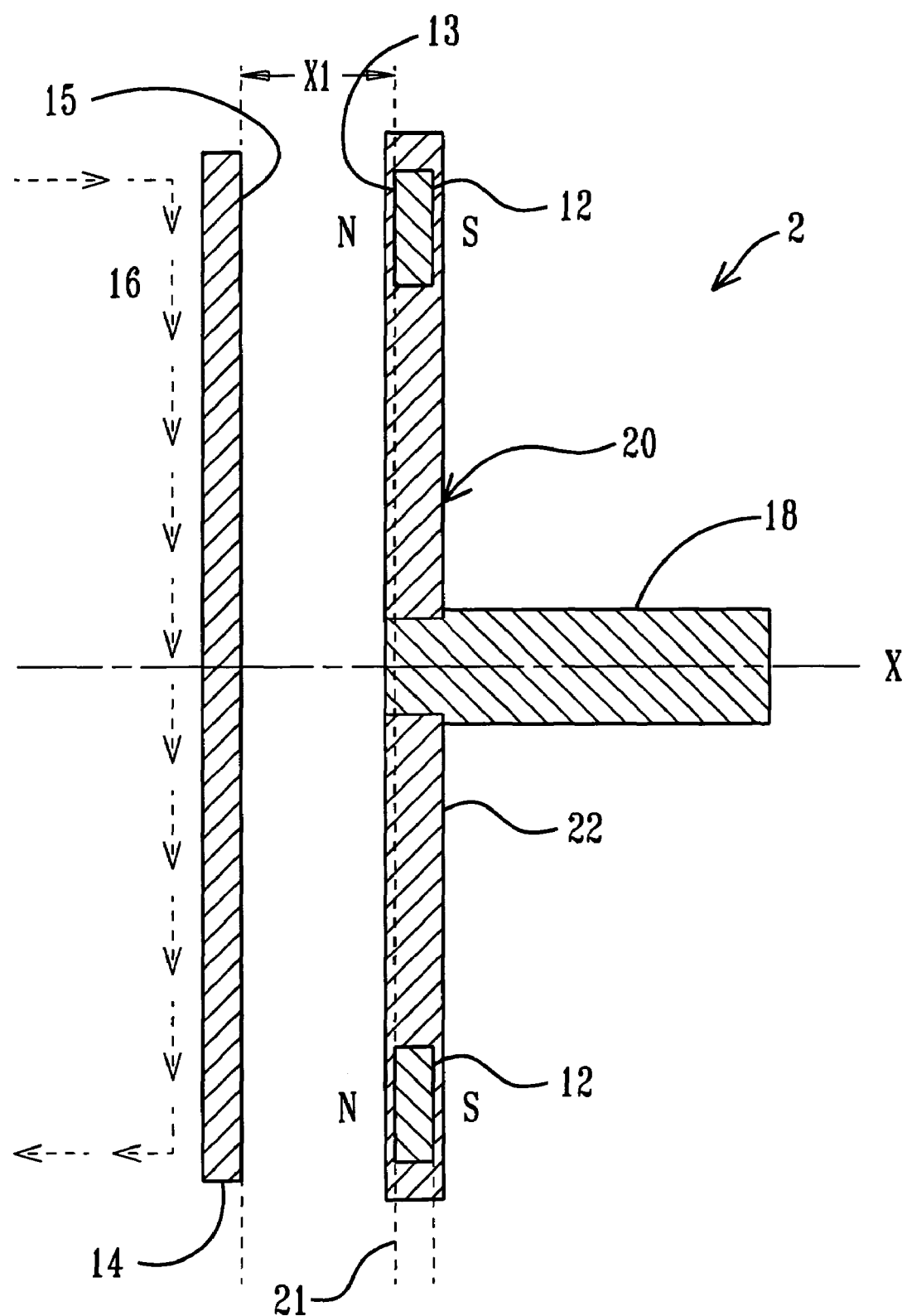
FIG. 1 is a side view of an embodiment of a magnetic heater, in accordance with the present invention.

FIG. 1 is a side view of an embodiment of a magnetic heater 2 in accordance with the present invention. The magnetic heater 2 comprises a magnet assembly 20 and a conductive member 14 disposed proximate the magnet assembly 20. Rotation of the magnet assembly 20 about an x-axis induces a predetermined cyclical variation of magnetic field within the conductive member 14.

Figure 2:
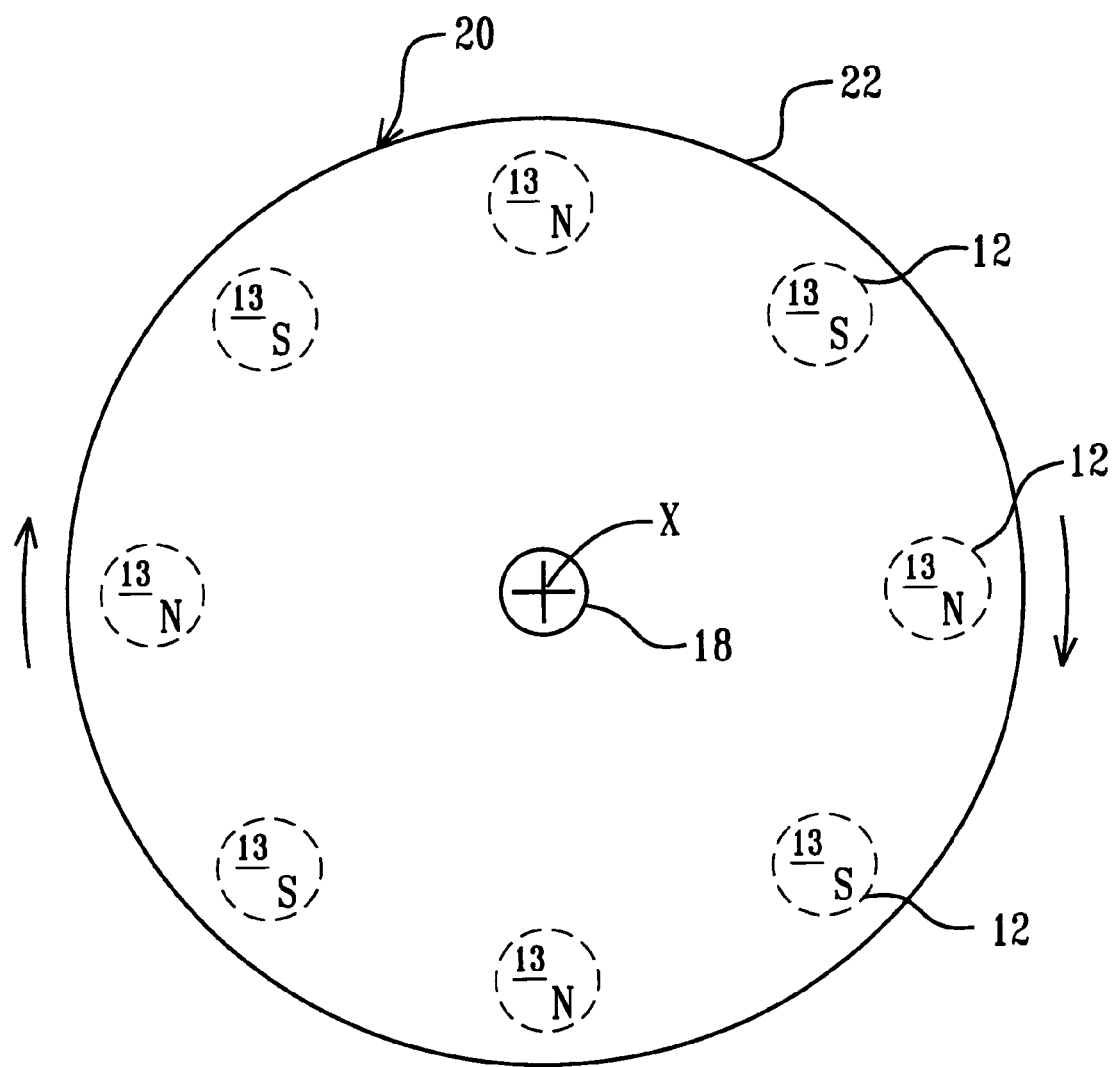
FIG. 2 is a front view of the magnet assembly of FIG. 1.

FIG. 2 is a front view of the magnet assembly 20. The magnet assembly 20 comprises a disk-shaped frame 22, a plurality of magnets 12, and a shaft 18. The plurality of magnets 12 are coupled to and arranged in a planar, generally circular, spaced-apart, orientation on the frame 22. The magnets 12 each have a first magnet surface 13 in a substantially planar relationship, referred herein as the first magnet plane 21, shown in FIG. 1. The shaft 18 is coupled substantially at the center of rotation of the frame 22. The center of rotation of the frame 22 defines the x-axis which is substantially perpendicular to the first magnet plane 21. The shaft 18 is adapted to couple with an energy source capable of imparting rotation to the shaft 18.

The conductive member 14 has a planar conductive member first side 15 in opposing, substantially parallel relationship with the first magnet plane 21. The conductive member first side 15 and the first magnetic plane 21 are in spaced-apart opposing relationship a predetermined distance referred herein as a conductor/magnet spacing X1.

As the shaft 18 of the frame 22 is rotated, the magnets 12 move relative to the conductive member first side 15 of the conductive member 14. A given point on the conductive member 14 will, therefore, be exposed to a cyclically varying magnetic field as each of the magnets 12 approach, pass over, and retreat from adjacent that given point. The given point on the conductive member 14 will thus be heated as long as the given point is exposed to the time-varying magnetic field.

It is appreciated that the magnet assembly 20 can comprise one or more magnets 12. One magnet 12 is sufficient to expose a cyclically varying magnetic field onto the conductive member 14. Therefore, it is appreciated that when reference is made to a plurality of magnets 12, it applies also to embodiments comprising one magnet 12, and vice-versa.

In embodiments of the present invention, the magnets 12 are permanent magnets. Therefore, the magnets 12 have a substantially constant magnetic field strength. This is contrasted with an electromagnet, which has the capability of producing a range of magnetic field strength dependent on varying the current driving the electromagnet. Therefore, the strength of the magnetic field produced by the permanent magnets 12 that the conductive member is exposed to primarily depends on the conductor/magnet spacing X1. The magnetic field strength of the permanent magnet 12 is referred to as the absolute magnetic field strength.

A fluid path 16 is defined such that heat transfer between the conductive member 14 and fluid moving within the fluid path 16 is enabled. Thus, as the conductive member 14 is heated, the fluid absorbs at least a portion of the heat generated. The fluid can thus be used to transport the heat to another location.

The radial and axial placement of the magnets 12 about the frame 22 as shown in FIGS. 1 and 2 is exemplary only. Placement of the magnets 12 about the frame 22 in other arrangements, orientations, spacing, among other things, in planar relationship or otherwise, is anticipated suitable for a particular purpose of imparting a magnetic field onto the conductive member 14 and/or onto additional conductive members. Furthermore, the magnets 12 need not be of the same size, shape, polar orientation, composition, or type, another other things.

In the embodiment of FIGS. 1 and 2, the magnets 12 are oriented such that the conductive member 14 is exposed to an alternating polarity from adjacent magnets 12, with their north poles N either pointing towards or away from the conductive member 14. Such an arrangement produces a relatively large range of variation in the magnetic field on the conductive member 14 as compared with, for example, wherein all of the magnets 12 present the same polarity to the conductive member 14.

Relative motion between the conductive member 14 and the magnets 12 is produced, wherein the magnets 12, are caused to rotate about the x-axis and holding the conductive member 14 stationary.

Figure 3:
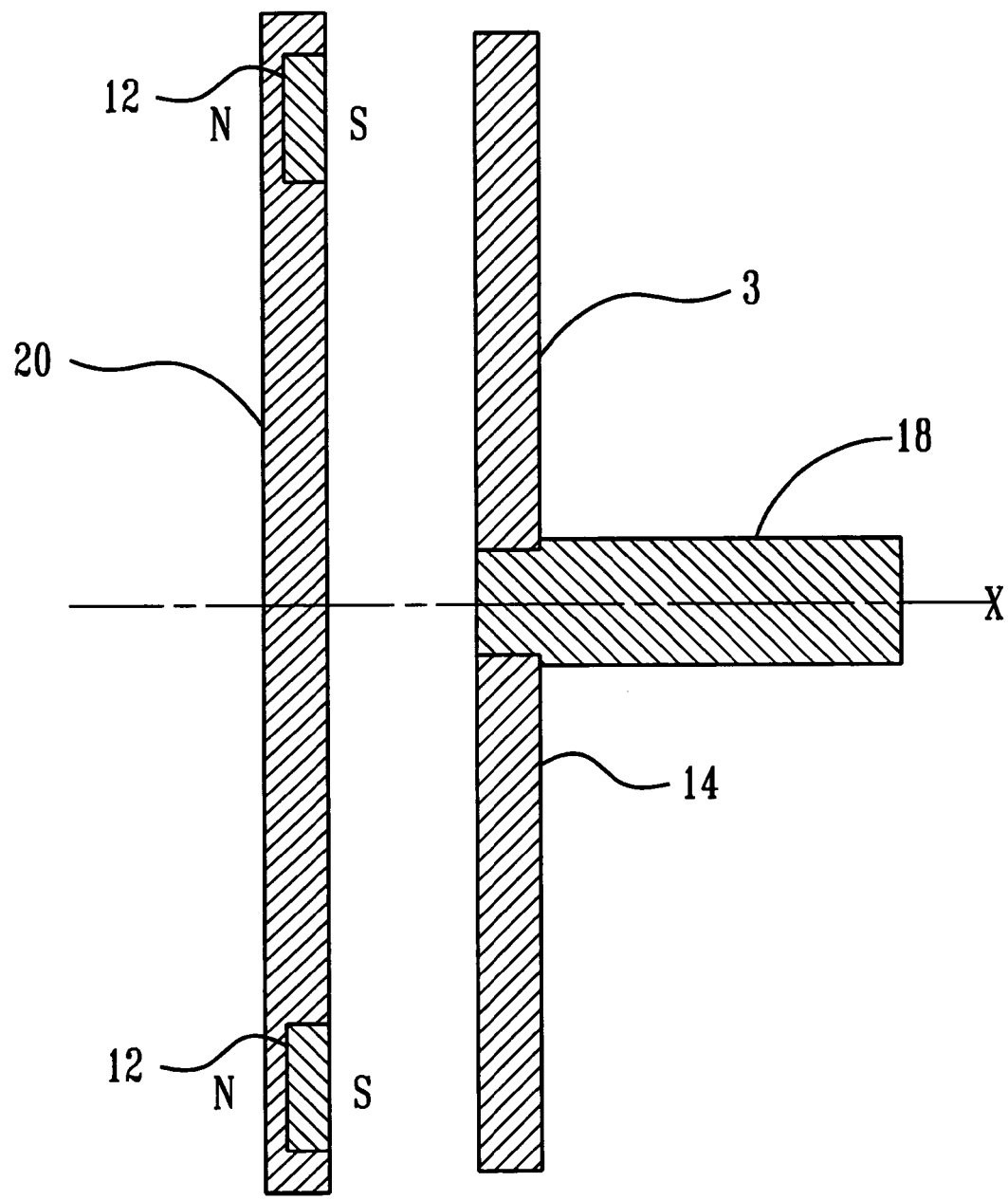
FIG. 3 is a side view of a magnetic heater, in accordance with an embodiment of the present invention.

FIG. 3 is a side view of a magnetic heater 3 wherein the conductive member 14 is caused to rotate about the x-axis and holding the magnets 12 stationary. The conductive member is coupled to a shaft 18 that is coupled to an energy source suitable for rotating the shaft 18 about the x-axis.

It is understood that relative motion between the magnets 12 and the conductive member 14 can be produced, in accordance with embodiments of the present invention, by the above mentioned configurations, and by other configurations, such as, but not limited to, rotation of both magnets 12 and conductive member 14 at different rates in the same direction, and rotation of both magnets 12 and conductive member 14 in opposite directions.

The absolute magnetic field strength of the magnet 12 is a measure of the magnitude of the magnetic field generated by the magnet 12 at a point on the magnet. For permanent magnets, the absolute magnetic field strength is essentially fixed. For electromagnets, the absolute magnetic field strength depends on the amount of current passing through the magnets coils.

The magnetic field exerted on the conductive member 14 depends on, among other things, the absolute magnetic field strength of the magnet 12 and the conductor/magnet spacing X1 between the magnet 12 and the conductive member 14.

A variety of magnets 12 are suitable for embodiments of the present invention. Permanent magnets 12 are advantageous for certain embodiments, for at least the reason that it is not necessary to supply electrical power to the magnets 12, hence no wiring or power source is needed for such purpose.

The rate of heat generation in a magnetic heater 2, 3 in accordance with embodiments of the present invention depends in part on the absolute magnetic field strength of the magnets 12. Therefore, for applications wherein a high rate of heat generation is desirable, it is also desirable that the magnets 12 have a relatively high absolute magnetic field strength.

In addition, the maximum temperature that can be generated by a magnetic heater 2, 3 according to the embodiments of the present invention depends in part on the heat tolerance of the magnets 12. Permanent magnets have a "maximum effective operating temperature" above which their magnetic field begins to degrade significantly.

Electromagnets likewise suffer from decreased performance with increasing temperature, though the decrease is not as well defined as that of permanent magnets. For example, the resistance of the magnetic field coils in an electromagnet gradually increases with increasing temperature, which in turn gradually reduces the current flow at a given voltage, generating still more heat. Magnets of both types are available suitable for use at elevated temperatures.

Permanent magnets known as rare earth magnets, such as, but not limited to Samarium Cobalt magnets, have a relative high absolute magnetic field strength and operating temperature, and are suitable for the particular purpose.

The conductive member 14 comprises an electrically conductive material suitable for the particular purpose. Suitable materials include, but are not limited to, copper, aluminum, alloys of copper, alloys of aluminum, and other metallic or non-metallic, electrically conductive substances. The conductive member 14 of the embodiment of FIG. 1 is generally disc-shaped. The conductive member 14 is not particularly limited to a specific shape, size, or configuration. In other embodiments, the conductive member is formed in two or more pieces, as a thin conductive layer on a non-conductive substrate, having define apertures therein, among other configurations.

Figure 4:
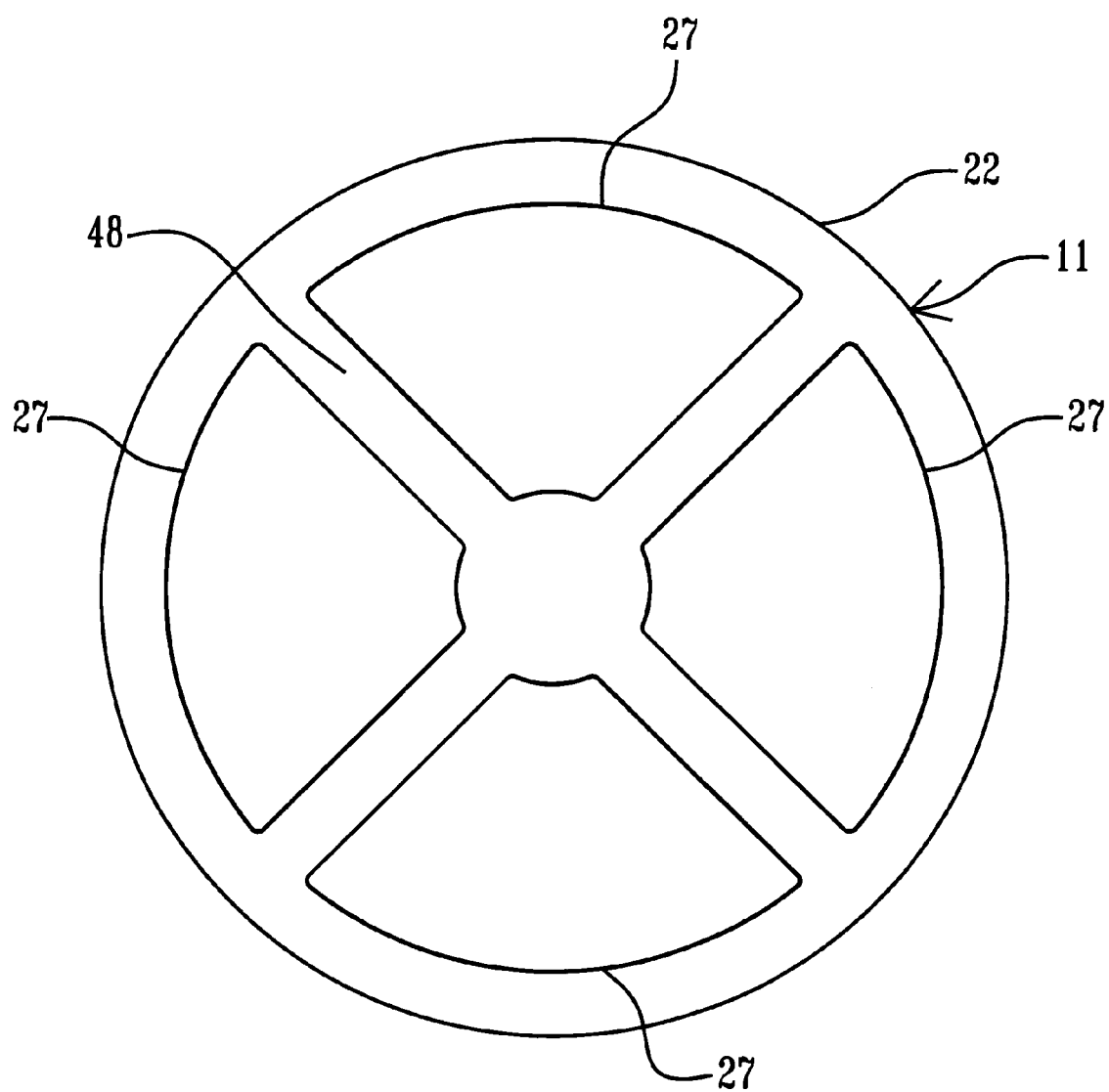
FIG. 4 is a front view of a conductive member comprising a plurality of separate conductors, in accordance with an embodiment of the present invention.

The conductive member 14 need not consist of a closed loop or integral piece of conductive material. FIG. 4 is a front view of a conductive member 14 comprising a plurality of separate conductors 27 that are separated from one another by non-conductive material 48 in accordance with an embodiment of the present invention. In such a case, each conductor 27 is heated independently.

Likewise, the conductive member 14, even if a single contiguous piece of conductive material, might be shaped with apertures, or be constructed of wires, beams, rods, etc., with empty space therebetween.

Figure 5:
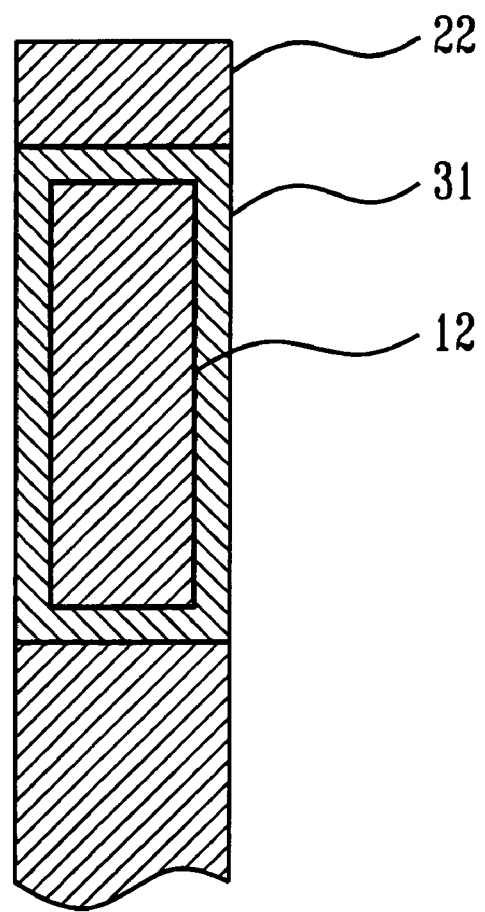
FIG. 5 is a portion of the frame with a cross-sectional view of a magnet and a protective layer provided on the exterior of the magnet, in accordance with an embodiment of the present invention.

FIGS. 1 through 3 show the magnetic heater 2, 3 in simplified schematic form for clarity. It is understood that additional structure may be present to provide structural support for containment and alignment. FIG. 5 is a portion of the frame 22 with a cross-sectional view of a magnet 12 and a protective layer 31 provided on the exterior of the magnet 12. The protective layer 31 is selected for a particular purpose, including, but not limited to, thermal protection, additional structural integrity, and chemical protection.

A variety of materials are suitable for use as the protective layer 31, so long as they do not significantly reduce the propagation of the magnetic field of the magnet 12.

In one embodiment, the protective layer 31 comprises aluminum. It is noted that aluminum has a high reflectivity, thus inhibiting the absorption of heat by the magnet 12, and a high infrared emissivity, thus facilitating the rapid re-radiation of heat away from the magnet 12. These properties combine to provide passive cooling for the magnet 12. In addition, aluminum is relatively durable, and so a protective layer 31 of aluminum serves to protect the magnet 12 physically. Likewise, aluminum is relatively impermeable, and thus may effectively seal the magnet 12 against any potential corrosive effects due to moisture, oxygen, fluid flowing through the fluid path 16 (see below), among other things.

In addition, for certain embodiments, the magnetic heater may include an additional active or passive cooling mechanism for the magnets 12. A wide variety of cooling mechanisms are suitable for the particular purpose. For example, passive cooling mechanisms include, but are not limited to, heat sinks and radiator fins. Active cooling mechanisms include, but are not limited to, coolant loops and refrigeration units.

It is noted that the fluid flow path 16, as described below, may be configured to act as a cooling mechanism. Embodiments of the present invention use fluid to provide a mechanism for absorbing heat from the conductive member 22, and it is well suited for absorbing heat from the magnets 12 as well.

In embodiments in accordance with the present invention, heat is generated for use via direct conduction or radiation from the conductive member 22. For example, heat could be transferred from the conductive member 14 to a solid heat conductor, heat sink, or heat storage device, such as, but not limited to, a mass of ceramic, brick, stone, etc.

Figure 6:
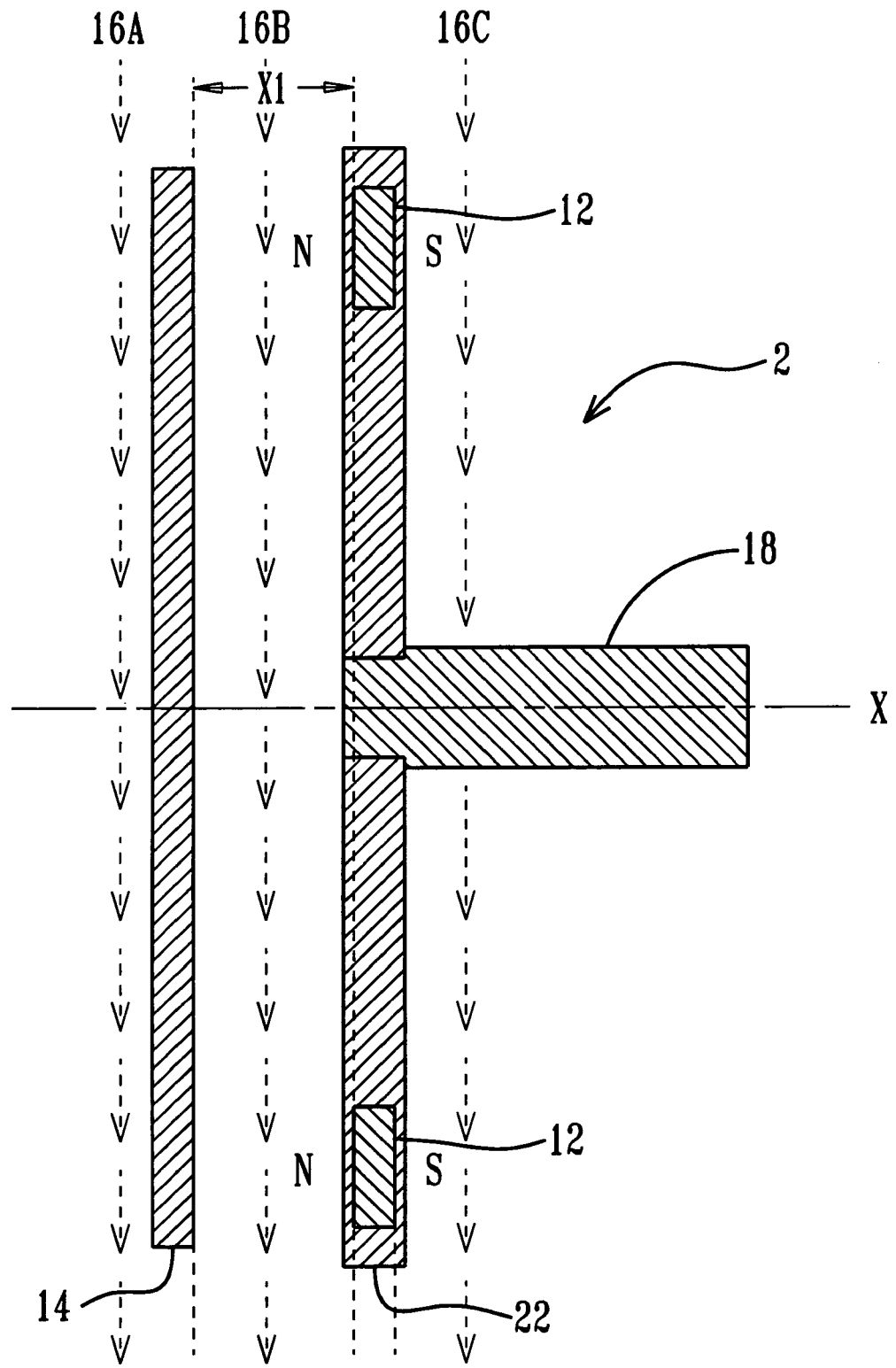
FIG. 6 is a side view of an embodiment of a magnetic heater, in accordance with the present invention.

FIG. 6 is a side view of the magnetic heater 2 wherein the fluid path 16 is defined so that at least a portion thereof extends between the magnets 12 and the conductive member 14 in accordance with embodiments of the present invention. The fluid path 16 extends substantially parallel with the conductive member 14 and the magnets 12, between the magnets 12 and the conductive member 14.

Suitable fluids for the particular purpose include, but are not limited to, gaseous fluids such as air and liquid fluids such as water. When the conductive member 22 is heated, fluid in the fluid path 16 receives heat from conductive member 22. Heat transfer from the conductive member 22 to fluid in the fluid path 16 may occur via one or more of conduction, convection, and radiation.

Figure 7:
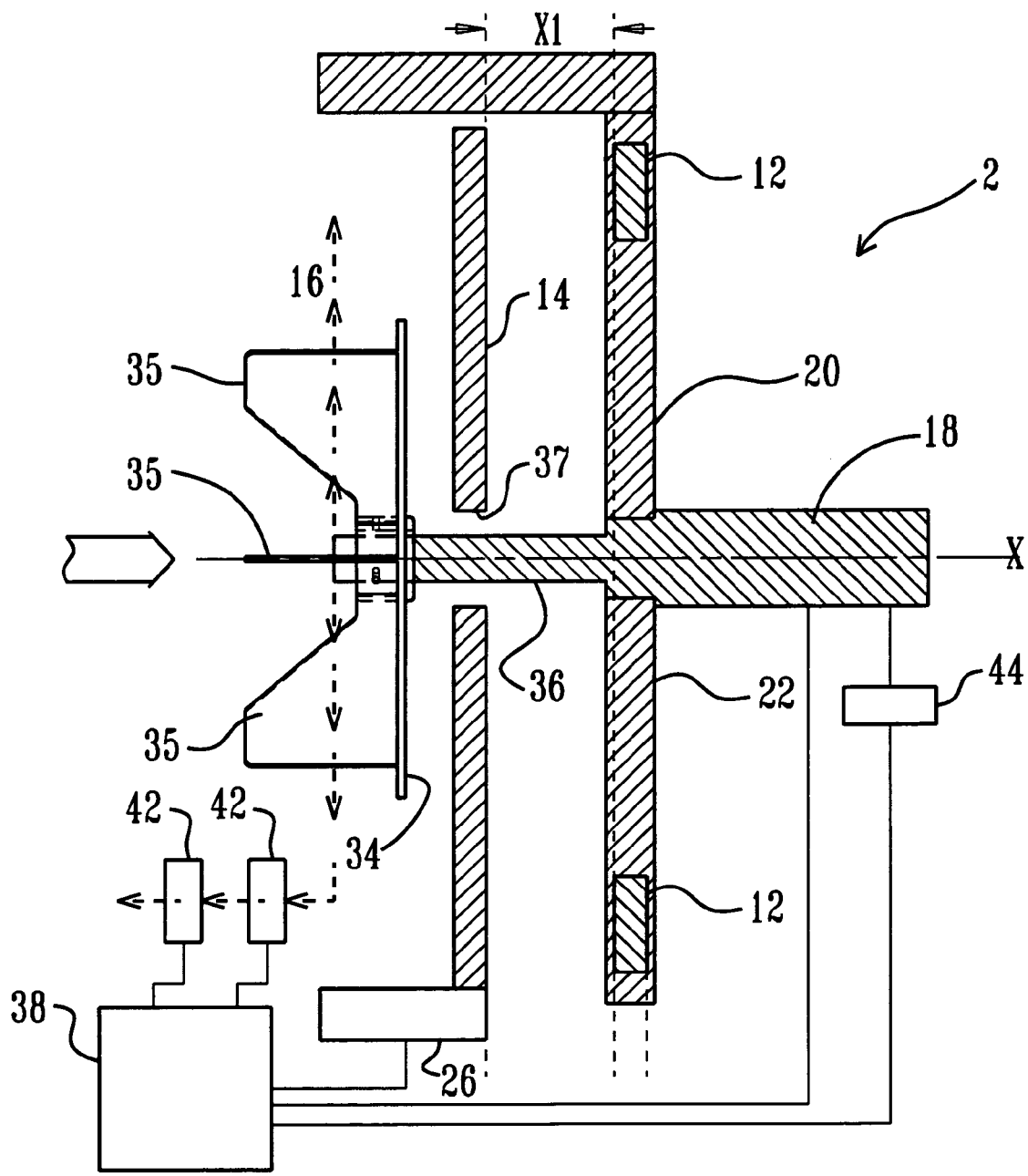
FIG. 7 is a side view of a magnetic heater, in accordance with an embodiment of the present invention.
Figure 8:
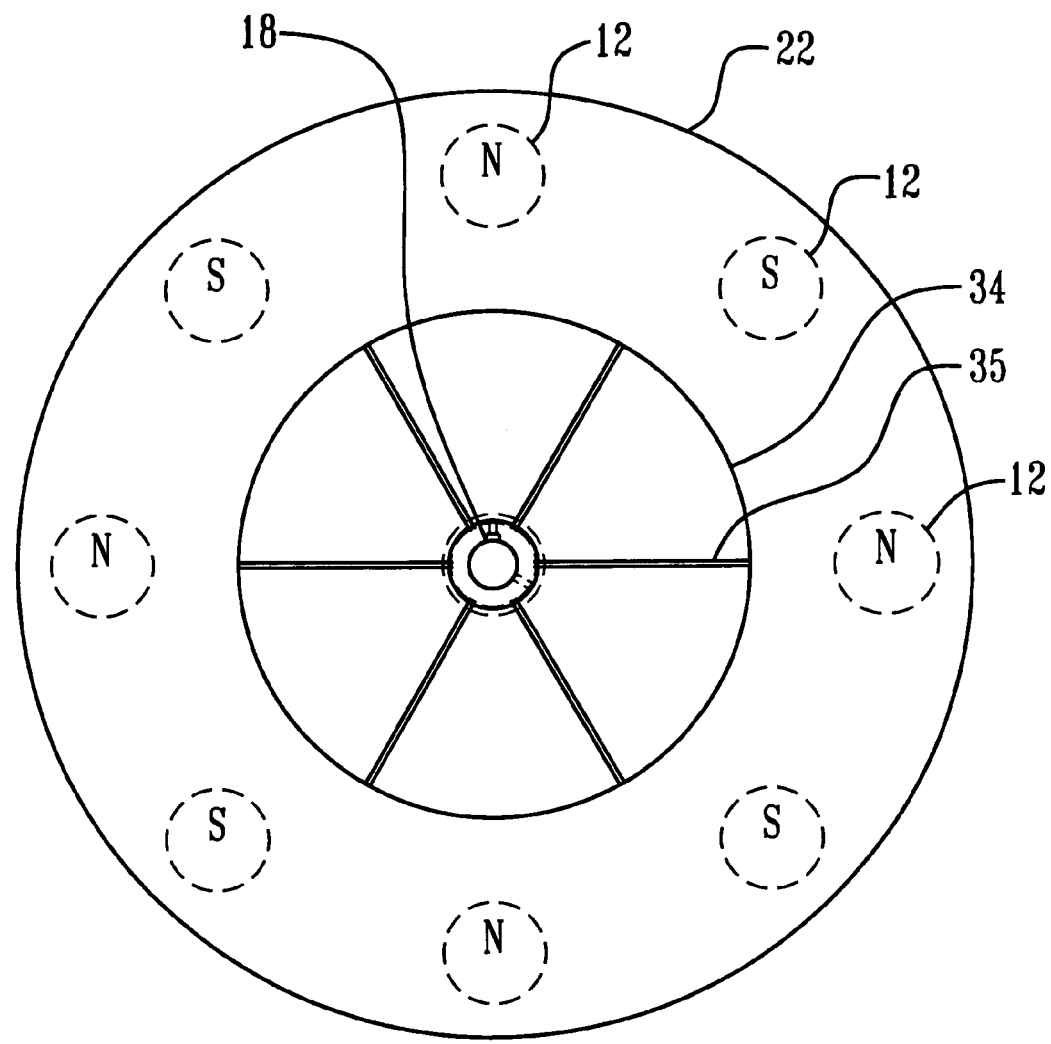
FIG. 8 is a front view of the embodiment of FIG. 7.

FIGS. 7 and 8 are side and front views of an embodiment of the magnetic heater 2 further comprising a fluid driver 34 engaged with a fluid path 16 for driving fluid therethrough, in accordance with the present invention. The fluid driver 34 comprises a plurality of fins 35 or blades and a driver shaft 36. Examples of suitable fluid drivers 34 include, but are not limited to, finned rotors, squirrel cages, and fans. In the embodiment of FIG. 7, the driver shaft 36 extends through an aperture 37 in the conductive member 14 and is coupled to the frame 22 on which the magnets 12 are arranged. The driving action is provided by rotation of the frame 22, which turns the fluid driver 34 in a predetermined direction. Thus, the speed of operation of the fluid driver 34 therein depends on the speed of motion of the frame 22, and likewise the rate of fluid flow within the fluid path 16. In other embodiments, the driver shaft 36 is coupled to, among other things, the shaft 18 or an external energy source.

In an embodiment wherein the conductive member 14 rather than the frame 22 moves to produce the cyclically varying magnetic field, the fluid driver 34 is driven by the rotation of the conductive member 14.

It is appreciated that the temperature to which fluid passing through the fluid path 16 is heated depends on the rate of heat generation in the conductive member 14, that is, on the amount of heat available to warm the fluid. Also, the temperature of the fluid depends on the rate at which the fluid moves through the fluid path 16, that is, on how much fluid is available to absorb the heat that is generated.

Also because the parameters, including rate of heat generation, rate of fluid flow, and fluid temperature, are independent of one another as described in some embodiments herein, a magnetic heater 2 in accordance with embodiments of the present invention is used to produce a specific temperature of fluid in combination with a specific quantity of fluid flow. Any two of the three parameters can be controlled independently of one another.

The energy source used to drive the shaft 18 can comprise any suitable means.

In embodiments in accordance with the present invention, the shaft 18 is coupled with a power take-off found on some vehicles, such as, but not limited to, many tractors, other agricultural vehicles, and heavy work vehicles. In such vehicles, some or all of the mechanical driving force generated by the engine is transferred to the power take-off to impart rotation, such as to the shaft 18. Conventional power take-offs include a rotatable coupling or other movable component, which is engaged with a linkage to impart rotation to the shaft 18.

In other embodiments, the shaft 18 comprises a hydraulic linkage. Certain vehicles include hydraulic systems, such as, but not limited to, for actuating a snow plow or shovel blade, for tipping a truck bed, or for operating a fork lift. The hydraulic system is adapted to couple with a piece of supplemental equipment, such as a hydraulic motor, with suitable linkage adapted to couple with the shaft 18, to provide power thereto. Hydraulic systems and hydraulic linkages are known in the art, and are not described in detail herein.

Various embodiments are anticipated so as to control the rate of heat output of the magnetic heater 2.

Figure 9A:
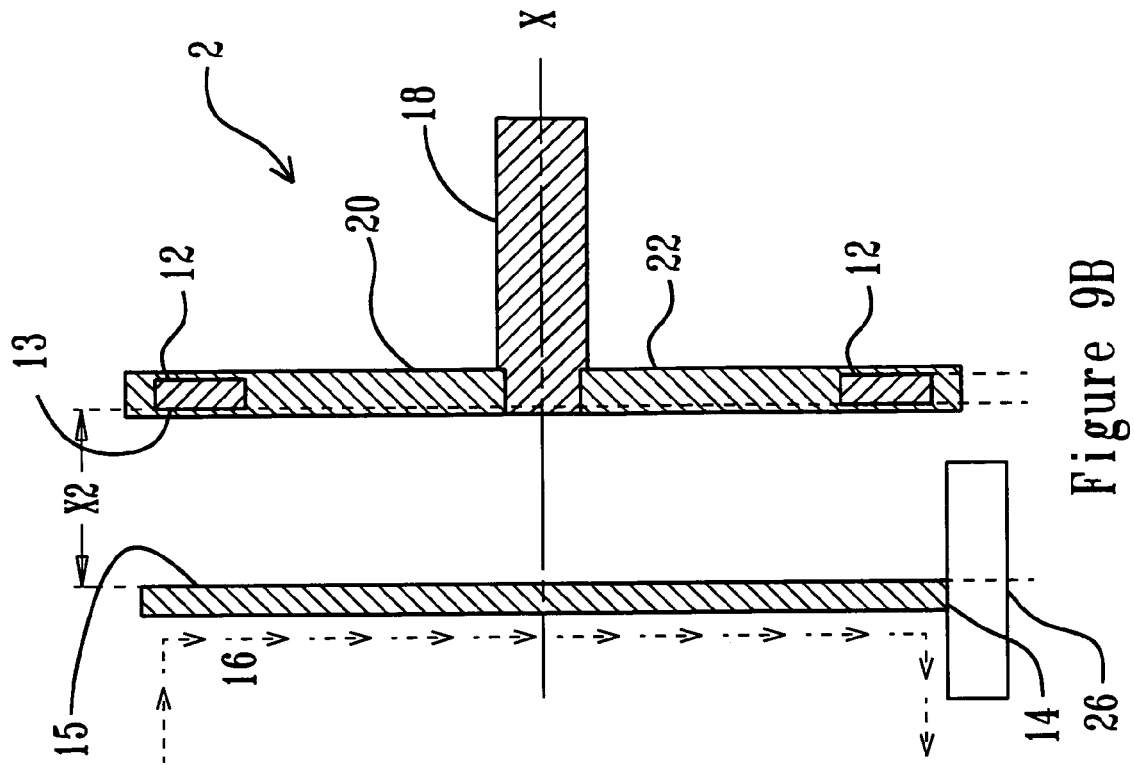
FIGS. 9A and 9B are side views of the magnetic heater comprising a spacing actuator for varying the conductor/magnet spacing, in accordance with an embodiment of the present invention.
Figure 9B:
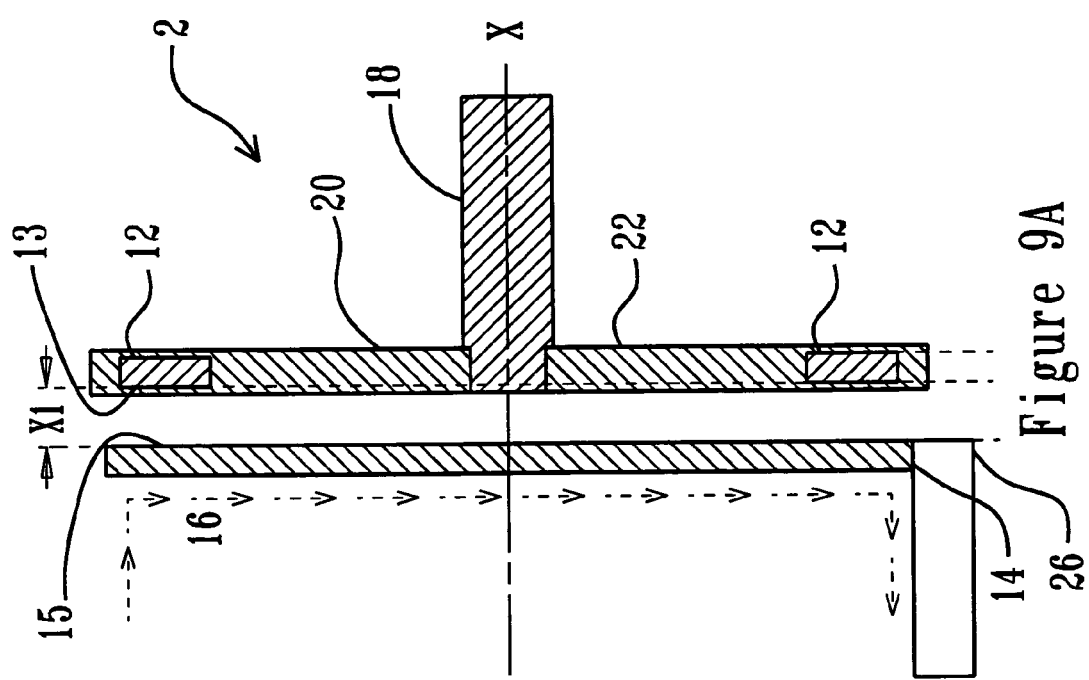

FIGS. 9A and 9B are side views of the magnetic heater 2 of FIG. 1, further comprising a spacing actuator 26 for varying the conductor/magnet spacing X1, in accordance with an embodiment of the present invention. The spacing actuator 26 varies the conductor/magnet spacing X1 between the conductive member first side 15 and the first magnet surface 13 along the x-axis.

The strength of the magnetic field exerted on a given portion of the conductive member 14 depends in part on the conductor/magnet spacing X1 between the magnets 12 and the conductive member 14. A change in the conductor/magnet spacing X1 changes the magnetic field strength to which the conductive member 14 is exposed, and thus changes the range of variation of the magnetic field over a cycle (the cyclical variation of the magnetic field), which changes the rate at which heat is generated in the conductive member 14. For permanent magnets, the cyclical variation of the magnetic field is accomplished while the absolute magnitude of the magnetic field strength remains substantially constant.

Reducing the conductor/magnet spacing X1 increases the magnetic field strength on the conductive member 14 and increases the magnetic induction, thus increasing the heating of the conductive member 14. Increasing the conductor/magnet spacing X1 reduces the magnetic field strength on the conductive member 14 and reduces the magnetic induction, thus reducing the heating of the conductive member 14.

In embodiments wherein it is desirable to enable a relatively high maximum rate of heat generation, it is desirable that a minimum value of the conductor/magnet spacing X1 between the conductive member 14 and the magnets 12 be as small as is practical. Similarly, in embodiments wherein it is desirable to enable a high range of variability in the rate of heat generation, it is desirable that the range of possible values for the conductor/magnet spacing X1 between the conductive member 14 and the magnets 12 is relatively large.

The conductor/magnet spacing X1 is a parameter that is independent of the rate of motion of the magnets 12 with respect to the conductive member 14, and thus independent of the rate of cyclical variation of the magnetic field. Thus, the rate of heat generation of the magnetic heater 2 is adjustable by varying the conductor/magnet spacing X1 without changing the period of cyclical variation of the magnet magnetic field.

Likewise, the conductor/magnet spacing X1 is independent of the absolute magnetic field strength of the magnets 12. Thus, the rate of heat generation of the magnetic heater 2 is adjustable by varying the conductor/magnet spacing X1 without changing the absolute magnetic field strength of the magnets 12. What is changing with varying the conductor/magnet spacing X1, among other things, is the magnitude of the magnetic field that the conductive member 14 is exposed to.

The rate of heat generation of the magnetic heater 2 is adjustable while it is generating heat by adjusting the conductor/magnet spacing X1.

The spacing actuator 26 is engaged with either the magnet assembly 20 or the conductive member 14 so as to vary the conductor/magnet spacing X1 therebetween. In other embodiments, the magnetic heater 2 comprises separate spacing actuators 26 engaged with the magnet assembly 20 and the conductive member 14. Such arrangements facilitates adjustment of the conductor/magnet spacing X1, and consequently facilitates adjustment of the rate of heat generation. In an embodiment in accordance with the present invention, the spacing actuator 26 is used to facilitate adjustment of the conductor/magnet spacing X1 while the magnetic heater 2 is generating heat.

A variety of actuators are suitable for use as the spacing actuator 26. In one embodiment, as schematically illustrated in FIGS. 9A and 9B, the spacing actuator 26 is a simple linear actuator, engaged with the conductive member 14 to move it toward or away from the magnet assembly 20, thereby adjusting the conductor/magnet spacing from X1 to X2.

In an embodiment in accordance with the present invention, the spacing actuator 26 is a manual actuator, such as, but not limited to, a threaded screw controlled by a hand-turned knob. In other embodiments, the spacing actuator 26 is a powered actuator, such as, but not limited to, an electrically or hydraulically driven mechanism.

Referring again to FIG. 7, the magnetic heater 2 further comprises a controller 38. The controller 38 is in communication with the spacing actuator 26, so as to control the conductor/magnet spacing X1. The controller 38 also is in communication with the shaft 18, so as to control the speed of motion of the magnet assembly 20, and therefore, the magnets 12, which derive their motion from the shaft 18, wherein the output of the motive device driving the shaft 18 is variable and controllable.

The fluid driver 34 is engaged with the magnet assembly 20 so that the speed of operation of the fluid driver 34, and consequently the rate of fluid flow along the fluid path 16, also is determined by the speed of motion of the magnet assembly 20.

The controller 38 in FIG. 7 thus controls the rate of heat generation by controlling the conductor/magnet spacing X1, and also controls the rate of fluid flow by controlling the rate at which the fluid driver 34 operates. By controlling these two parameters independently, the temperature of the fluid also can be controlled as described previously.

A variety of devices are suitable for use as a controller 38, including, but not limited to, integrated circuits. Controllers are known in the art, and are not described further herein.

Although the embodiment in FIG. 7 shows the controller 38 in communication with various sensors, it is emphasized that this is exemplary only. In other embodiments, the controller 38 controls the operation of the magnetic heater 2 without sensors or data therefrom. In embodiments in accordance with the present invention, the controller 38 comprises stored data and/or a pre-calculated algorithm, based on, among other things, the design of the magnetic heater 2 and the performance of similar magnetic heaters 2. The controller 38 controls the magnetic heater 2 to produce the desired levels of heat generation, fluid temperature, and/or rate of fluid flow, without the need for active sensors to monitor the parameters of the magnetic heater 2 itself.

The embodiment in FIG. 7 includes a fluid temperature sensor 40, for sensing the temperature of fluid moving along the fluid path 16. It also includes a fluid flow rate sensor 42, for sensing the rate of fluid flow through the fluid path 16. It further includes a drive sensor 44, for sensing the rate at which the magnet assembly 20 is driven by the shaft 18. The controller 38 is in communication with each of the sensors 40, 42, and 44.

Based on data from the sensors 40, 42, and 44, the controller 38 adjusts the speed of the magnet assembly 20, the speed of the fluid driver 34, and/or the conductor/magnet spacing X1, so as to control heat generation, fluid temperature, and/or fluid flow.

It is emphasized that the arrangement of the sensors 40, 42, and 44 as shown is exemplary only. It is not necessary for a particular embodiment to include sensors at all, or to include each of the sensors 40, 42, and 44 shown in FIG. 7. In other embodiments, other sensors are included in the magnetic heater 2 in addition to or in place of those shown.

In one embodiment, the magnetic heater 2 comprises an additional sensor adapted to sense the conductor/magnet spacing X1 between the magnets 12 and the conductive member 14.

A variety of sensors are suitable for use in a magnetic heater 2 according to embodiments of the present invention, depending upon the particulars of the specific embodiment of the magnetic heater 2 and the type of information that is to be sensed. Sensors are known in the art, and are not described further herein.

In previously described embodiments, the magnets 12 are restricted from moving relative to the frame 22. In other embodiments of the present invention, the magnets 12 are adapted to move relative to the frame 22. The relative motion of the magnets 12 with respect to the frame 22 facilitates a mode of control over the magnetic field strength at the conductive member 14 and thus controls the heating of the conductive member 14 and the heat output of the magnetic heater 2.

In some embodiments in accordance with the present invention, apparatus for moving the magnets 12 are passively operated; while in other embodiments, they are actively operated. In embodiments wherein the movement is active, the relative movement is provided, among other means, by an actuator, such as a motor or linear drive mechanism.

FIG. 10A is a side view of a rotatable magnet assembly 120 comprising a frame 22, at least one magnet 12, and at least one passive relative-positioning actuator 70a adapted to move one or more magnets 12 in an axial direction X and a radial direction Y relative to the frame 22, in accordance with an embodiment of the present invention. Such movement can be exploited to control the magnetic field strength at the conductive member 14 by controlling, among other things, the conductor/magnet spacing X1.

The passive relative-positioning actuator 70a comprises a pivot mount 69, a first linkage arm 72, a second linkage arm 74, a linkage guide 76, and a bias member 78. The pivot mount 69 is adapted to couple with one or more magnets 12. The first linkage arm 72 comprises a first linkage-arm first-end 73 and a first linkage-arm second-end 71. The first linkage-arm first-end 73 is pivotally coupled to the frame 22 and the first linkage-arm second-end 71 is pivotally coupled to the pivot mount 69. The second linkage arm 74 comprises a second linkage-arm first-end 77 and a second linkage-arm second-end 75. The second linkage-arm first-end 77 is pivotally coupled to the pivot mount 69 and the second linkage-arm second-end 75 is coupled in sliding engagement with the linkage guide 76.

The bias member 78 comprises a bias member first-end 178 and a bias member second-end 278. The bias member second-end 278 is coupled to the second linkage-arm second-end 75 and the bias member first-end 178 is coupled to the frame 22 preferentially positioned to apply bias when the bias member second-end 278 is moved in a radial direction Y away from the x-axis. When the frame 22 is at rest, the pivot mount 69 is positioned off-set from the center of gravity of the frame 22 towards the intended movement so that the centrifugal acceleration can move the magnet 12 in the intended direction.

The linkage guide 76 is adapted to guide and restrict the second linkage-arm second-end 75 to movement in a substantially radial Y direction. Embodiments of the linkage guide 76 include, but are not limited to, a through-slot, track, flange, and a race.

Rotation of the frame 22 about the x-axis induces centrifugal acceleration on the pivot mount 69 so as to urge the magnet 12 in a combination of movement away from the x-axis in a radial direction Y as well as lateral to the x-axis in the radial direction X. The first and second linkage arms 72, 74 pivot about their respective linkage-arm ends 71, 73, 75, 77 as the second linkage-arm second-end 75, guided by the linkage guide 76, is caused to slide from a first position A towards a second position B. The bias member 78 is adapted to biasly control the movement of the second linkage-arm second-end 75 within the linkage guide 76, so as to provide a restoring force towards A when moved from A towards B.

A predetermined amount of bias for a particular purpose is determined by the biasing properties of the bias member 78, the speed of rotation of the frame 22, the weight of the pivot mount 69, and the magnet 12, and the first and second linkage arms 72, 74, among other things.

The pivot mount 69 is pivotally coupled to the first and second linkage-arms 72, 74 in such a way so as to retain the first magnet surface 13 of the magnet 12 in a substantially constant orientation parallel with the conductive member first side 15 as the magnet 12 moves relative to the frame 22. This coupling is done in any number of known ways, such as, but not limited to, cams, gears, and preferential weight balance.

Figure 11:
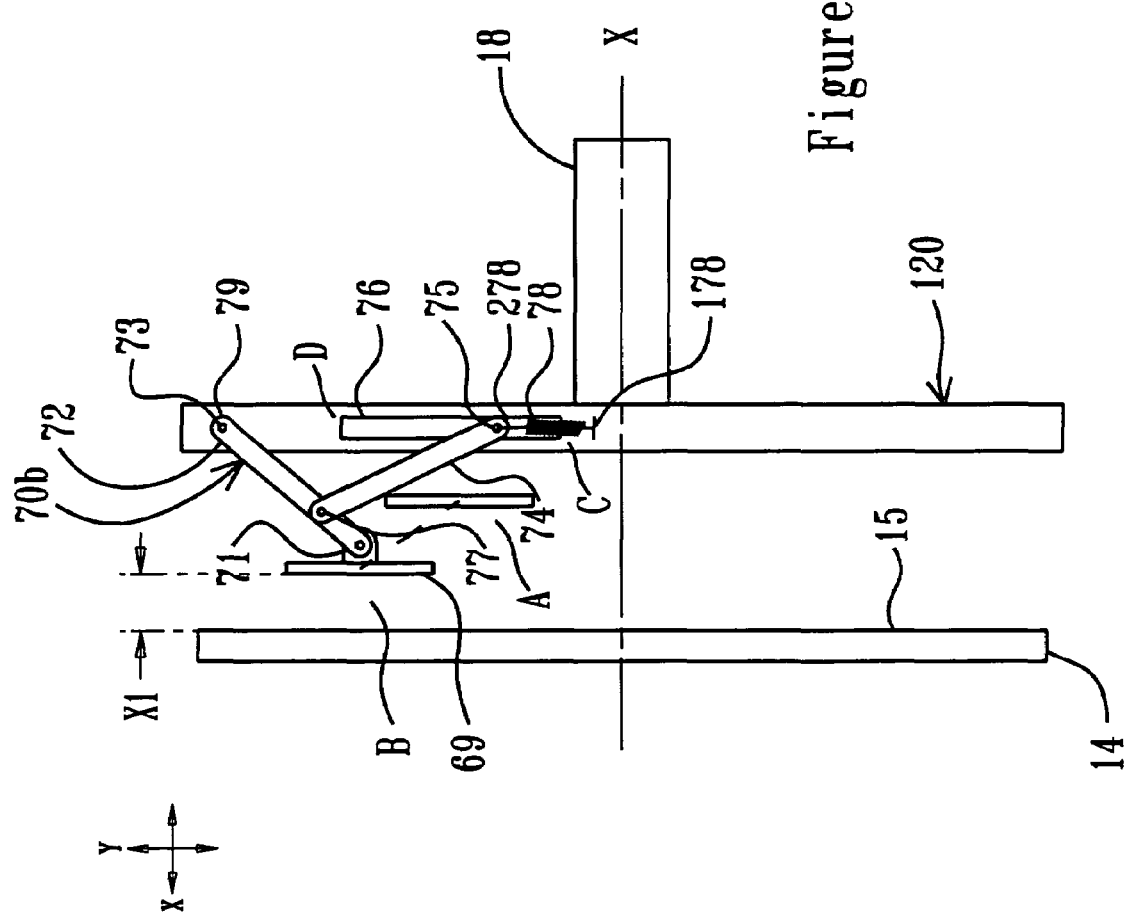
FIG. 11 is a side view of a rotatable magnet assembly comprising a linkage-arm apparatus, in accordance with an embodiment of the present invention.

FIG. 11 is a side view of a rotatable magnet assembly 120 wherein the second linkage arm 74 is pivotally coupled to the first linkage arm 72 between the first linkage-arm first-end 73 and the first linkage-arm second-end 71.

Movement of the magnet 12 in both the radial direction Y and the axial direction X is used advantageously in a number of regards. In one embodiment, the magnet 12 is positioned to move towards the conductive member 14 as the frame 22 is rotated at a faster rate inducing higher heating of the conductive member 14. Movement of the magnet 12 towards the conductive member 14 increases the magnetic field strength at the conductive member 14, increasing the rate of heating of the conductive member 14. The rate of inductive heating of the conductive member 14, in part, is a function of the square of the separation distance of the magnet 12 from the conductive member 14.

Further, as the frame 22 is rotated faster, the magnet 12 is moved at a faster rate relative to the conductive member 14, increasing the cyclical variation of the magnetic field on the conductive member 14 and inducing a greater heating of the conductive member 14. The rate of inductive heating of the conductive member 14 is a linear function of the speed of rotation of the frame 22 with respect to the conductive member 14. The combination of the squared function of inductive heating with decreasing conductor/magnet spacing X1 and the linear function of inductive heating with increasing speed of rotation, produces a heating rate somewhat higher than one of either a change of the conductor/magnet spacing X1 or rotation speed by themselves.

It is appreciated that the opposite effect occurs as the rate of rotation of the frame 22 is decreased, producing a decreased component of heating due to the increased conductor/magnet spacing X1 and a reduced component of heating from the reduced rate of cyclical variation of the magnetic field, to produce a lower overall heating of the conductive member 14.

Referring again to FIG. 10A, in another embodiment, a conductive member 14' is positioned on a side of the rotatable magnet assembly 120 away from the magnet 12 such that the pivot mount 69, and thus the magnet 12, is positioned to move away from the conductive member 14' as the frame 22 is rotated at a faster rate. Movement of the magnet 12 away from the conductive member 14 decreases the magnetic field strength at the conductive member 14', in turn decreasing the rate of heating of the conductive member 14' attributed to magnetic field strength.

Further, with the increase in the speed of movement of the magnet 12 as the frame 22 is rotated faster, the cyclical variation of the magnetic field on the conductive member 14' is also accelerated causing a greater heating of the conductive member 14'. The combination of the squared function of reduced inductive heating with increasing conductor/magnet spacing X1 and the linear function of inductive heating with increased speed of rotation, is predetermined to produce a desired heating effect. This counter-balanced effect can be used to provide a magnetic heater that produces an increase, a constant, or a decreased amount of heat with increased rotation speed. In one embodiment in accordance with the present invention, the rate of heat increase due to a higher rotation speed is substantially counter-balanced with the decrease in the rare of heat decrease as the conductor/magnet spacing X1 is increased, to produce a constant heating rate for a given range of rotation speed of the frame 22.

It is appreciated that the oppose effect occurs when the rate of rotation of the frame 22 is decreased, producing an increased component of heating from the reduced conductor/magnet spacing X1 and a reduced component of heating from the reduced rate of cyclical variation of the magnetic field, counter balanced to produce a constant heating of the conductive member 14'.

In another embodiment, the pivot mount 69, and thus the magnet 12, is positioned to move away from the conductive member 14 as the frame 22 is rotated at a faster rate in a predetermined way, inducing a decrease in the heating of the conductive member 14. Movement of the magnet 12 away from the conductive member decreases the magnetic field strength at the conductive member 14, decreasing the rate of heating of the conductive member 14 due to magnetic field strength. The rate of inductive heating of the conductive member 14 is a function of the square of the separation distance of the magnet from the conductive member 14.

Further, since the magnet 12 is being moved at a faster rate as the frame 22 is rotated faster, the cyclical variation of the magnetic field on the conductive member 14 is also accelerated, causing a greater heating of the conductive member 14. The rate of inductive heating of the conductive member 14 is a linear function of the speed of rotation of the frame 22 with respect to the conductive member 14. The combination of the squared function of reduced inductive heating with increasing conductor/magnet spacing X1 and the linear function of inductive heating with increased speed of rotation, can be predetermined such that overall heat output provided by a magnetic heater is increased, remains constant, or is decreased with a faster rate of rotation of the frame 22.

It is appreciated that the oppose effect occurs when the rate of rotation of the frame 22 is decreased, producing an increased component of heating from the reduced conductor/magnet spacing X1 and a reduced component of heating from the reduced rate of cyclical variation of the magnetic field, to produce an increase in heat output.

Figure 12:
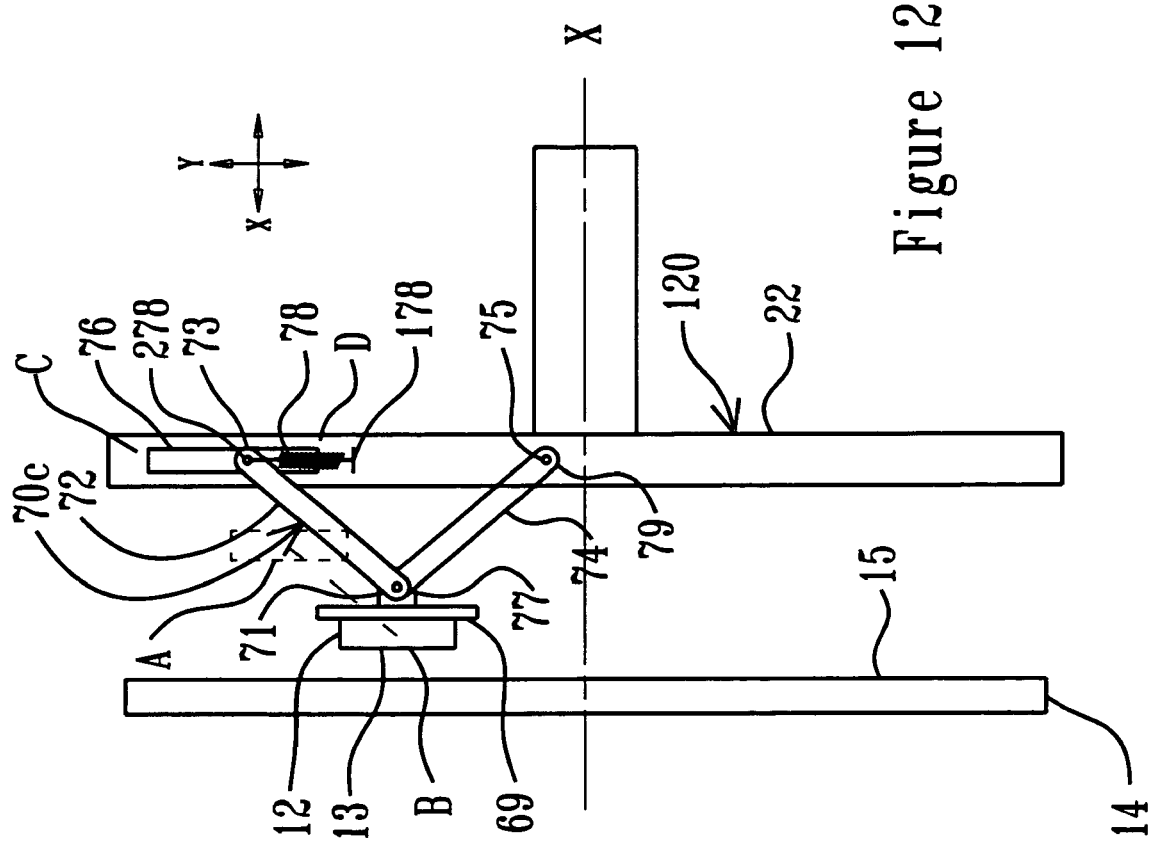
FIG. 12 is a side view of a rotatable magnet assembly comprising a linkage-arm apparatus, in accordance with an embodiment of the present invention.

FIG. 12 is a side view of a rotatable magnet assembly 120 comprising a frame 22, at least one magnet 12, and at least one passive relative-positioning actuator 70c adapted to move one or more magnets 12 in an axial direction X and a radial direction Y relative to the frame 22, in accordance with an embodiment of the present invention x-axis in a radial direction Y as well as lateral to the x-axis in the radial direction X. The pivot mount 69, and thus the magnet 12, is positioned adjacent the conductive member 14 such that the magnet 12 moves away from the conductive member 14 as the frame 22 is rotated at a faster rate in a predetermined way, inducing a decrease in the heating of the conductive member 14. Such movement can be exploited to control the magnetic field strength at the conductive member 14 by controlling, among other things, the conductor/magnet spacing X1.

The passive relative-positioning actuator 70c comprises a pivot mount 69, a first linkage arm 72, a second linkage arm 74, a linkage guide 76, and a bias member 78. The pivot mount 69 is adapted to couple with one or more magnets 12. The first linkage arm 72 comprises a first linkage-arm first-end 73 and a first linkage-arm second-end 71. The first linkage-arm first-end 73 is pivotally coupled to and coupled in sliding engagement with the linkage guide 76, and the first linkage-arm second-end 71 is pivotally coupled to the pivot mount 69. The second linkage arm 74 comprises a second linkage-arm first-end 77 and a second linkage-arm second-end 75. The second linkage-arm first-end 77 is pivotally coupled to the pivot mount 69 and the second linkage-arm second-end 75 is pivotally coupled to the frame 22.

The bias member 78 comprises a bias member first-end 178 and a bias member second-end 278. The bias member second-end 278 is coupled to the first linkage-arm first-end 73 and the bias member first-end 178 is coupled to the frame 22 preferentially positioned to apply bias to the first linkage-arm first-end 73 when the bias member second-end 278 is moved in a radial direction Y away from the x-axis. When the frame 22 is at rest, the pivot mount 69 is positioned off-set from the center of gravity of the frame 22 towards adjacent the conductive member 14 so that the centrifugal acceleration can move the magnet 12 in the intended direction.

The linkage guide 76 is adapted to guide and restrict the first linkage-arm first-end 73 to movement in a substantially radial direction Y. Embodiments of the linkage guide 76 include, but are not limited to, a through-slot, track, flange, and a race.

In another embodiment, the second linkage arm 74 is pivotally coupled to the first linkage arm 72 substantially as shown in FIG. 11.

Rotation of the frame 22 about the x-axis induces centrifugal acceleration on the pivot mount 69 so as to urge the magnet 12 in a combination of movement away from the x-axis in a radial direction Y as well as lateral to the x-axis in an axial direction X. The first and second linkage arms 72, 74 pivot about their respective linkage arm ends 71, 73, 75, 77 as the first linkage-arm first-end 73, guided by the linkage guide 76, is caused to slide from a first position A towards a second position B. The bias member 78 is adapted to biasly control the movement of the first linkage-arm first-end 73 within the linkage guide 76, so as to provide a restoring force towards A when moved from A towards B.

A predetermined amount of bias for a particular purpose is determined by the biasing properties of the bias member 78, the speed of rotation of the frame 22, and the weight of the pivot mount 69, magnet 12, and first and second linkage arms 72, 74, among other things.

The pivot mount 69 is pivotally coupled to the first and second linkage arms 72, 74 in such a way so as to retain the first magnet surface 13 of the magnet 12 in a substantially constant orientation parallel with the conductive member first side 15 as the magnet 12 moves relative to the frame 22. This is done in any number of known ways, such as, but not limited to, cams, gears, and preferential weight balance.

Figure 13:
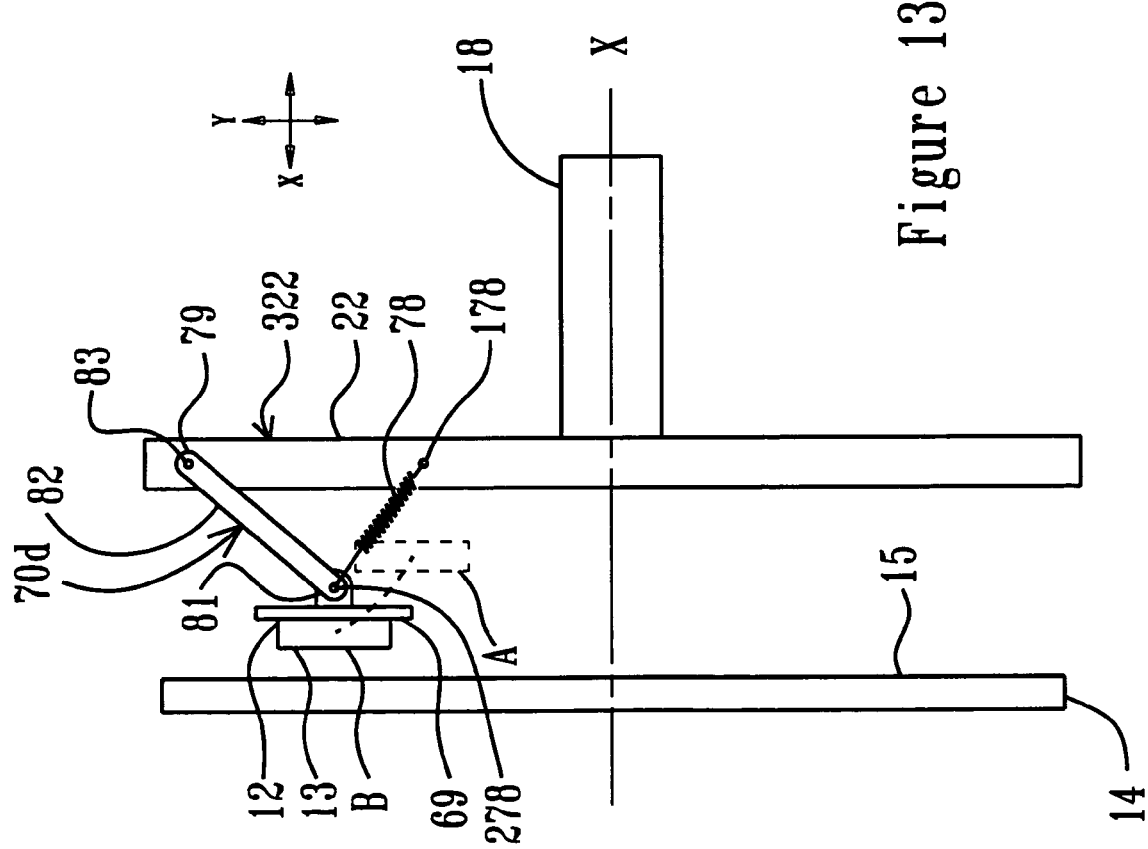
FIG. 13 is a side view of a rotatable magnet assembly comprising a linkage-arm apparatus, in accordance with an embodiment of the present invention.

FIG. 13 is a side view of a rotatable magnet assembly 322 comprising a frame 22 and at least one passive relative positioning actuator 20d, in which the magnets 12 are adapted to move relative to the frame 22, in substantially the same way as for the embodiments of FIG. 10A, in accordance with an embodiment of the present invention. Such movement can be exploited to control the magnetic field strength at the conductive member 14 as previously discussed.

The frame passive relative positioning actuator 20d further comprises a pivot arm 82, a pivot mount 69 adapted to couple with a magnet 12, and a bias member 78. The pivot arm 82 comprises a pivot arm first-end 83 and a pivot arm second-end 81. The pivot arm first-end 83 is pivotally coupled to the frame 22 and the pivot arm second-end 81 is pivotally coupled to the pivot mount 69. The bias member 78 comprises a bias member first-end 178 and a bias member second-end 278. The bias member first-end 178 is coupled to the frame 22 and the bias member second-end 278 is coupled to the pivot arm second-end 81. The pivot mount 69 is positioned, when the frame 22 is at rest, at an off-set from the center of gravity of the frame 22 towards the intended movement so that the centrifugal acceleration can move the magnet 12 in the intended direction.

Rotation of the frame 22 about the x-axis induces centrifugal acceleration on the pivot mount 69, and thus the magnet 12, so as to urge the magnet 12 in a combination of movement away from the x-axis in a substantially radial direction Y as well as along the x-axis in an axial direction X. The pivot arm 82 pivots about the frame 22 at the pivot arm first-end 83. The bias member 78 is adapted to biasly control the movement of the pivot arm second-end 81.

The amount of bias is determined by the biasing properties of the bias member 78, the speed of rotation of the frame 22, and the weight of the pivot mount 69, the magnet 12 and the pivot arm 82, among other things.

The pivot mount 69 is pivotally coupled to the pivot arm second-end 81 so as to retain the magnet 12 is a substantially constant orientation parallel with the conductive member 14. This can be done in any number of known ways, such as, but not limited to, cams, gears, and preferential weight balance.

In operation, as the frame 22 is rotated at a faster rate, centrifugal acceleration moves, or tends to move, the magnet 12 in a combination of radial direction Y and an axial direction X. The bias member 78 controls the extent of movement of the magnet 12 by controlling the movement of the pivot arm 82, to between positions A and B. As the frame 22 is rotated at a faster rate, the bias member 78 is further overcome so as to allow movement of the magnet 12 towards position B. As the rate of rotation of frame 22 is reduced, the bias member 78 urges the pivot arm second-end 81 towards position A.

Movement of the magnet 12 in both the radial direction Y and the axial direction X can be used advantageously in a number of regards, as previously described above for the embodiment of FIG. 10A.

Referring again to FIGS. 10A, 11, 12 and 13, other embodiments replace the bias member 78 with a biased pivot pin 79. Such biased pivot pins 79, otherwise known as self-closing hinges and spring-loaded pivot pins, are generally known in the art. The biased pivot pin 79 is utilized in substantially the same way as the bias member 78 previously described. The biased pivot pin 79 is adapted to provide a restoring force so as to move the magnet 12 toward position A. The biased pivot pin 79 can be made so as to be less intrusive to the flow path.

Figure 14B:
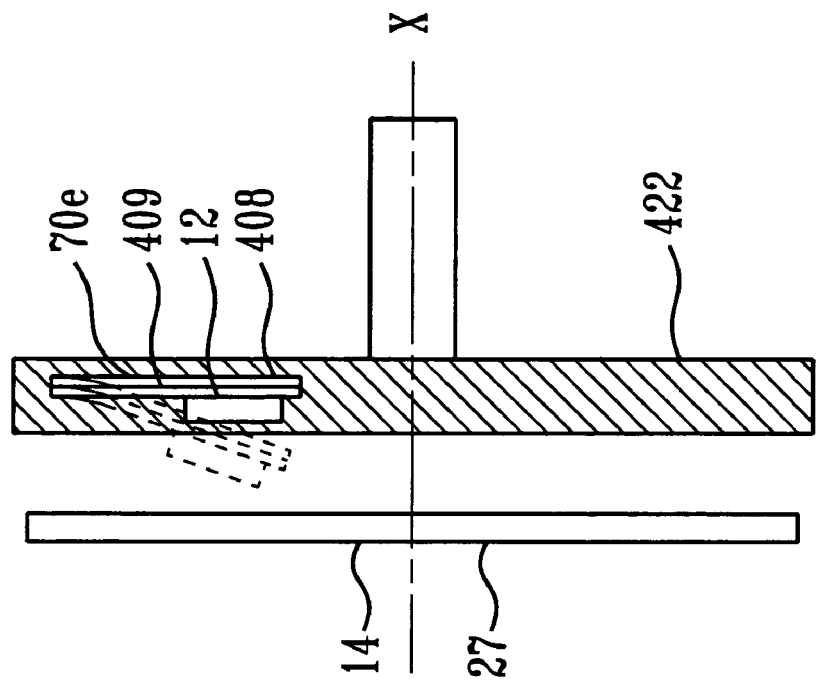
FIGS. 14A, 14B and 14C are front and side views of a bimetallic spring frame comprising one or more slots defining an axial-facing tang assembly, in accordance with an embodiment of the present invention.
Figure 14A:
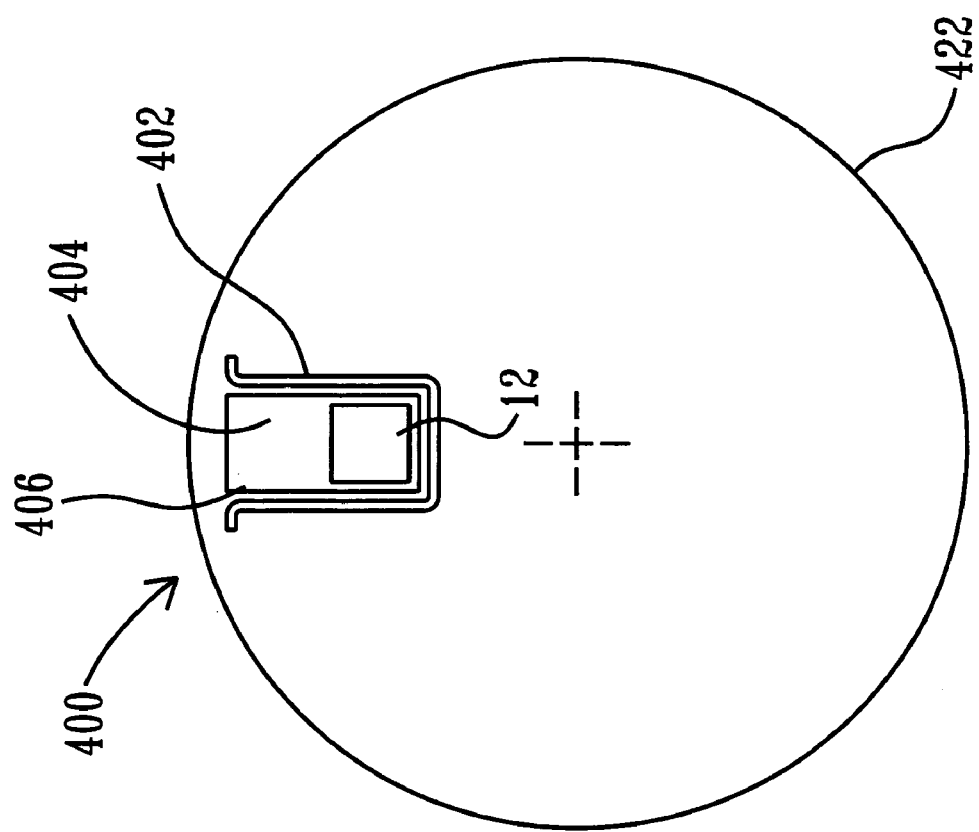
Figure 14:
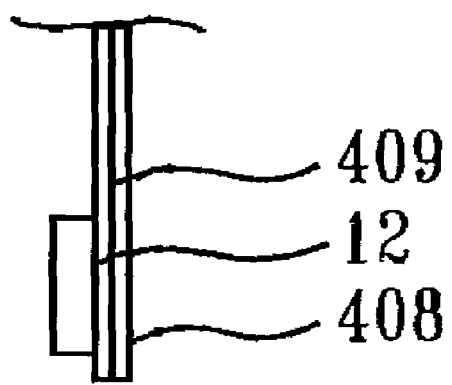

FIGS. 14A, 14B and 14C are front and side views of a bimetallic spring frame 422 comprising one or more slots 402, each defining an axial-facing tang 404. The tang 404 is adapted to couple with at least one magnet 12 or at least one conductive member 27. The tang 404 comprises a first material 408 having a first coefficient of thermal expansion and a second material 409 having a second coefficient of thermal expansion to form a bimetallic spring 400.

As the temperature of the bimetallic spring 400 rises, the bimetallic spring causes the tang 404 to deflect away. This movement can be used to move the magnet 12, or the conductor 27, away from the conductive member 14, or the magnet 12, thereby reducing the heating of the conductive member 27. In an embodiment, this provides a predetermined self-managing function such that the heat output remains substantially constant for a range of rotation speeds. In another embodiment, this provides a predetermined self-limiting function, whereas a maximum heat output is obtained above a predetermined rotation speed.

Figure 15A:
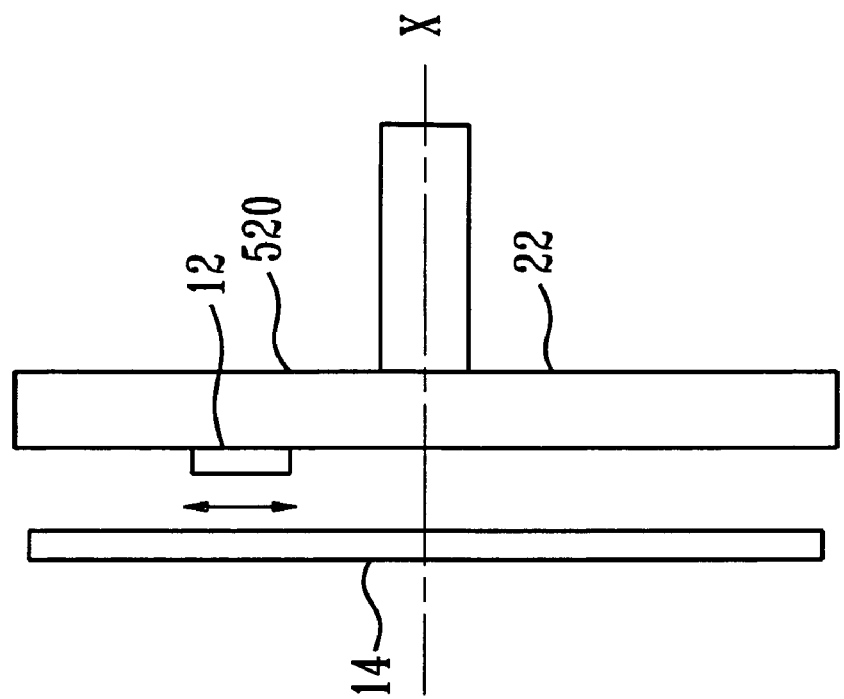
FIGS. 15A and 15B are side and front views of a rotatable magnet assembly, in accordance with an embodiment of the present invention.
Figure 15B:
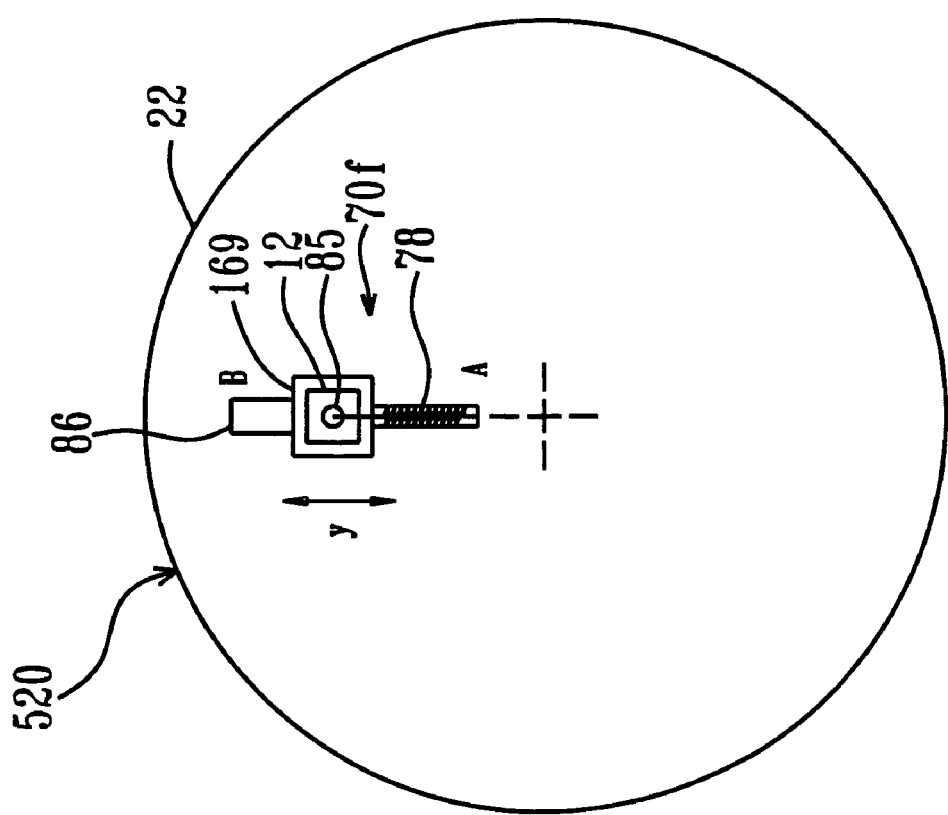

FIGS. 15A and 15B are side and front views of a rotatable magnet assembly 520 comprising a frame 22, at least one passive relative-positioning actuator 70f, and a magnet 12, in accordance with an embodiment of the present invention. The passive relative-positioning actuator 70f is adapted to move the magnet 12 in a radial direction relative to the frame 22. Radial movement of the magnet 12 can be exploited to control the magnetic field strength on the conductive member 14. The passive relative-positioning actuator 70f comprises a mount 169, a guide pin 85, and a bias member 78. The frame 22 further comprises a pin guide 86 adapted to slidingly receive the guide pin 85. The pin guide 86 is adapted to couple with the guide pin 85 to allow movement of the guide pin 85 about the pin guide 86 in the radial direction Y. The guide pin 86 is coupled to the mount 165 that is adapted to couple with the magnet 12. The bias member 78 comprises a bias member first-end 178 and a bias member second-end 278. The bias member first-end 178 is coupled to the frame 22 and the bias member second-end 278 is coupled to the mount 169.

Rotation of the frame 22 about the x-axis induces centrifugal acceleration on the magnet 12 so as to urge the magnet 12, guided by the guide pin 85 within the pin guide 86, away from the x-axis in a substantially radial direction Y. The guide pin 85, coupled within the pin guide 86, is adapted to slide from a first position A towards a second position B. The bias member 78 is adapted to biasly control the movement of the guide pin 85 within the pin guide 86 and to provide a restoring force to bias the magnet 12 back to position A when the frame 22 is not rotated or at a predetermined rate of rotation.

The amount of bias is determined by the biasing properties of the bias member 78, the speed of rotation of the frame 22, and the weight of the mount 169 and the magnet 12, among other things.

The magnet 12 is coupled to the mount 169 that is adapted to retain the magnet 12 in a constant orientation parallel with the conductive member 14.

In operation, as the frame 22 is rotated at a faster rate, centrifugal acceleration will move, or tend to move, the magnet 12 in a radial Y direction. In other embodiments, other passive relative-positioning actuators that provide radial positioning are anticipated, including a trolley and track assembly, among others.

Relative movement between the magnets 12 and the conductive member 14 induces the heating of the conductive member 14. This is regardless of whether only the magnet 12 is moving or only the conductive member 14 is moving, or both are moving relative to each other. The embodiments of FIGS. 10A, 11, 12, 13, 14, and 15, therefore, can be used to move the conductive member 14 rather than the magnet 12, to produce substantially the same result. In embodiments in accordance with the present invention, the conductive member, such as the conductive member 27 shown in FIG. 4, is coupled to the pivot mount 69, shown in FIGS. 10A, 11, 12, 13, 14, and 15 and positioned and rotated adjacent stationary magnets 14.

FIG. 10B is a side view of a conductive member assembly 140 comprising a conductive member frame 122, at least one conductive member 27, and at least one passive relative-positioning actuator 70a adapted to move one or more conductive members 27 in an axial direction X and a radial direction Y relative to the conductive member frame 122, in accordance with an embodiment of the present invention.

Figure 16A:
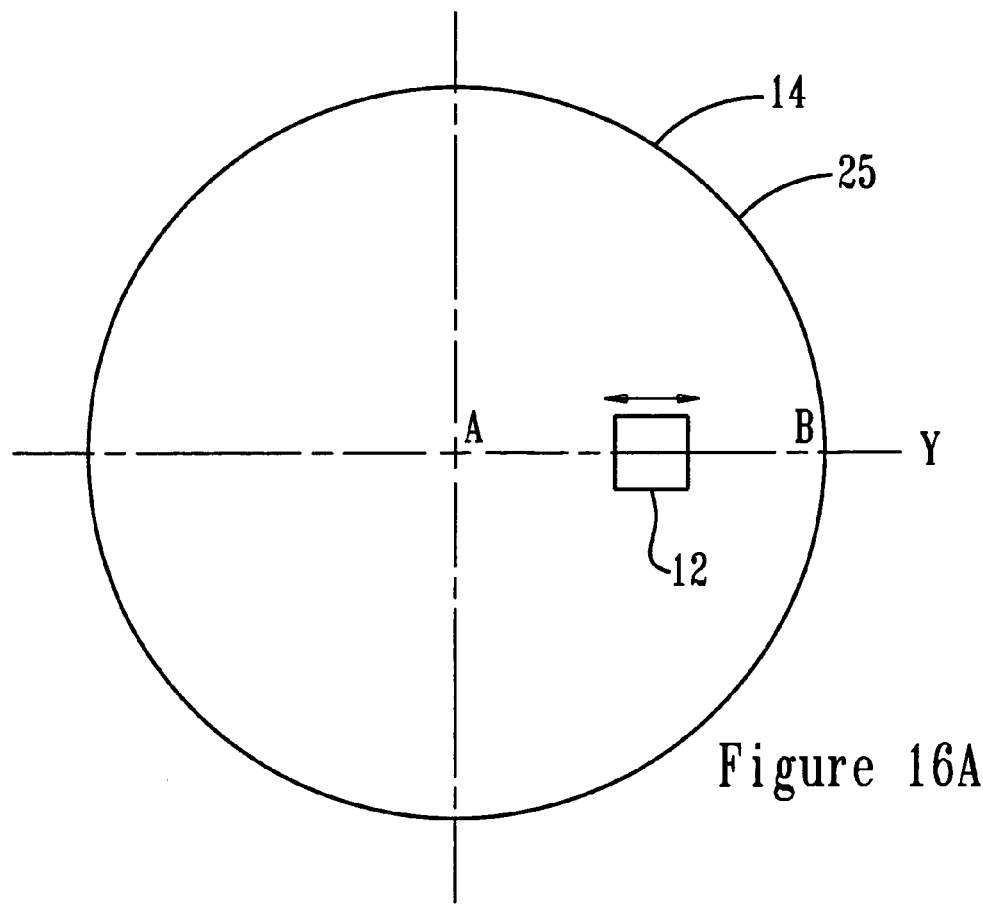
FIG. 16A is a front view of a radially moving magnet relative to a conductive member, in accordance with an embodiment of the present invention.

FIG. 16A is a front view of the conductive member 14 comprising a disc, in accordance with an embodiment of the present invention. The magnet 12 is shown to be moving relative to the conductive member 14 in a radial direction Y between position A and position B. As the magnet assembly (not shown) rotates at an increasing speed of rotation, the magnet 12 moves radially from position A to position B.

Figure 16B:
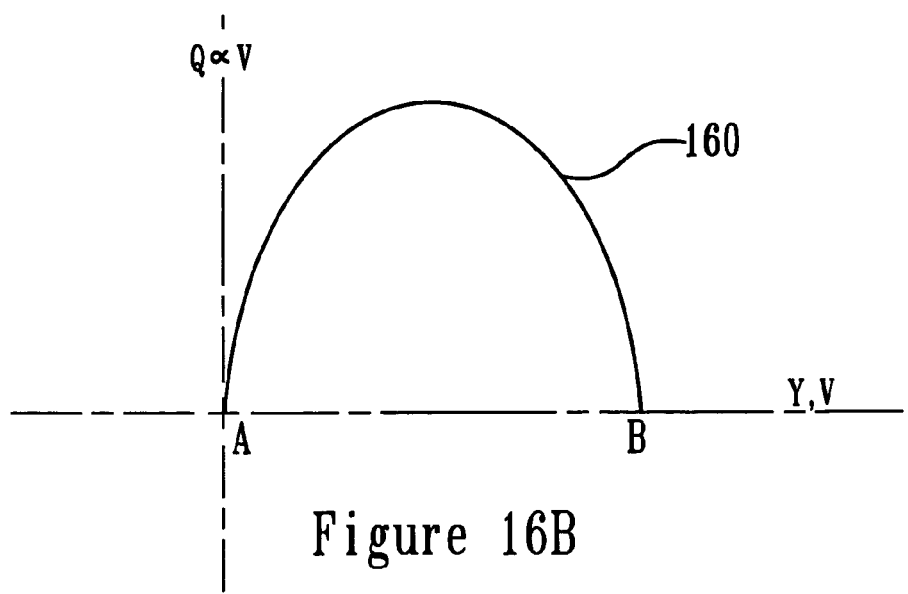
FIG. 16B is a graph showing a temperature curve illustrating the trend in the temperature generated in the conductive member with the change in radial position of the magnet, in accordance with an embodiment of the present invention.

FIG. 16B shows a temperature curve 160 illustrating the trend in the temperature generated in the conductive member 14 with the change in axial position of the magnet 12 that is directly related to the speed of rotation of the frame. The temperature curve 160 shows that heating increases as the rotation speed of the frame is increased. The heating decreases drastically as the magnet 12 traverses the peripheral edge 25 of the conductive member 14.

FIG. 17A is a front view of the conductive member 114 comprising a star shape, in accordance with an embodiment of the present invention. The magnet 12 is shown to be moving relative to the conductive member 14 in a radial direction Y between position A and position B. As the magnet assembly (not shown) rotates at an increasing speed of rotation, the magnet 12 moves radially from position A to position B. The conductive member 114 comprises a substantially disc-shaped central portion 172 and a plurality of arms 171 extending radially from the central portion 172. The arms 171 are of a predetermined shape for a particular purpose. The arms terminate at a peripheral edge 173 that define a circular arc 125 when rotating. The arms 171 present a reduced cross-sectional area that is exposed to the magnet 12 when adjacent the magnet 12 as compared with the disc-shaped conductive member 14 of FIG. 16A.

FIG. 17B shows a temperature curve 170 illustrating the trend in the temperature generated in the conductive member 114 with the change in axial position of the magnet 12. As the magnet 12 moves in a radial direction Y, the magnet 12 moves from adjacent the central portion 172 to adjacent to the arms 171 exposing a reduced surface area of the conductive member 114 to the varying magnetic field. With less surface area of the conductive member 114 available to heat the heat transfer fluid, the result is reduced heat output from the magnetic heater. In one embodiment, the arms 171 are tapered a predetermined amount so as to produce a constant heat output of the heater regardless of the radial position of the magnet 12, up to approaching the peripheral edge 173 of the arms 171. In another embodiment, the arms 171 are tapered so as to provide more surface area such that the heat output is increased or so as to provide less surface area such that the heat output is decreased. The heating decreases drastically as the magnet 12 traverses the peripheral edge 125 of the conductive member 114.

Figure 18A:
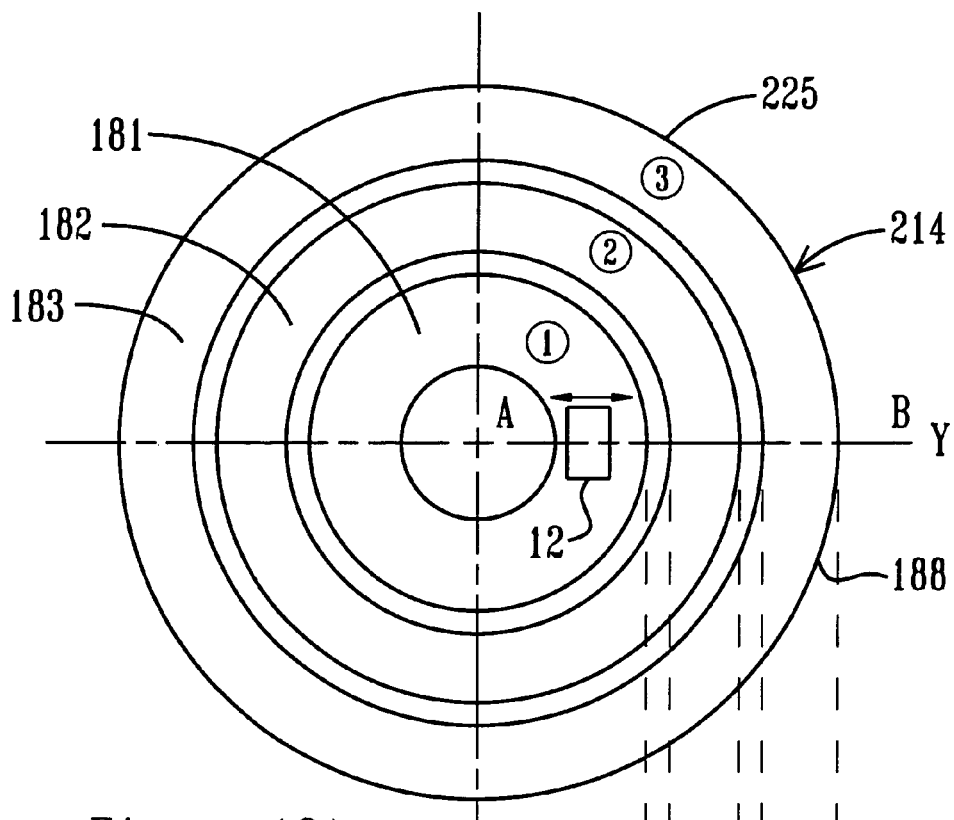
FIG. 18A is a front view of a radially moving magnet relative to a conductive member comprising a plurality of individual rings, in accordance with an embodiment of the present invention.

FIG. 18A is a front view of the conductive member 214 comprising multiple rings, in accordance with an embodiment of the present invention. The magnet 12 is shown to be moving relative to the conductive member 14 in a radial direction Y between position A and position B. As the magnet assembly (not shown) rotates at an increasing speed of rotation, the magnet 12 moves radially from position A to position B. The conductive member 214 comprises a plurality of individual rings: an inner ring 181, an intermediate ring 182, and an outer ring 183.

Figure 18B:
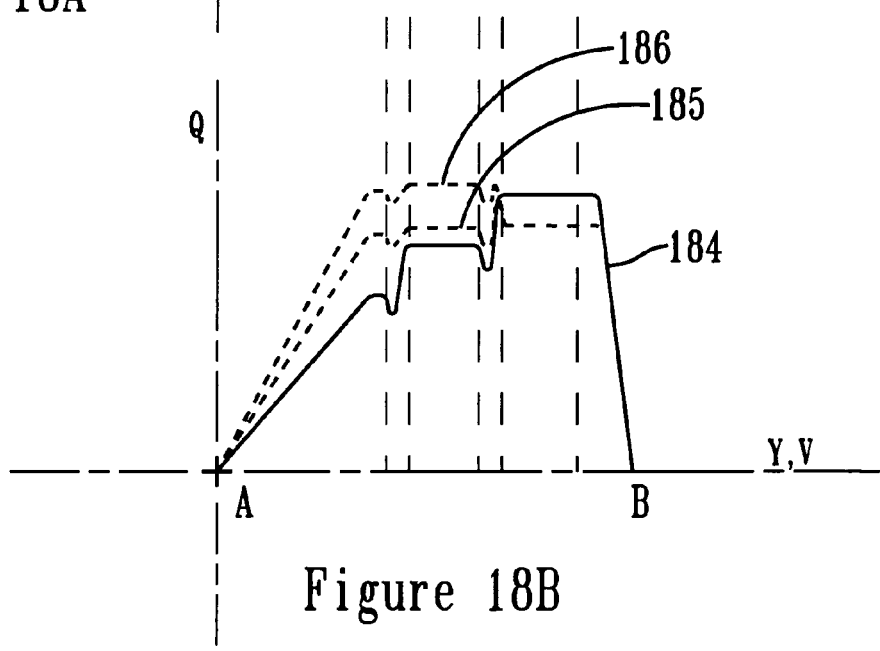
FIG. 18B is a graph showing a temperature curve illustrating the trend in the temperature generated in the conductive member with the change in radial position of the magnet, in accordance with an embodiment of the present invention.

FIG. 18B shows three temperature curves 184, 185, and 186 illustrating the trend in the temperature generated in the conductive member 14 with the change in axial position of the magnet 12 that is directly related to the speed of rotation of the frame for three embodiments. The temperature curve 184 shows that heating increases as the rotation speed of the frame is increased and the magnet 12 moves in a radial direction. The magnet 12 moves from adjacent the inner ring 181 to adjacent the intermediate ring 182, and then to adjacent the outer ring 183. In one embodiment, the inner ring 181, intermediate ring 182, and outer ring 183 are configured in a predetermined way so as to produce an increase in heating on the conductive member, as shown in the temperature graph of FIG. 18B, curve 184. The ring geometry, composition, and dimensions, among other things, are predetermined so that the combination of increased rotation speed producing an increase in magnetic variance and the increased surface area produces a net increase in heating of the heat transfer fluid. The heating decreases drastically as the magnet 12 traverses the peripheral edge 225 of the conductive member 214.

In another embodiment, as illustrated by curve 185, the inner ring 181, intermediate ring 182, and outer ring 183 are predetermined so as to produce a substantially constant heating on the conductive member regardless of the radial position of the magnet 12, up to approaching the peripheral edge 225 of the outer ring 183. In one embodiment, the surface area is configured so that the combination of increased rotation speed producing an increase in magnetic variance is counterbalanced by a reduced surface area to produce a net constant heating of the heat transfer fluid.

In another embodiment, as illustrated by curve 186, the inner ring 181, intermediate ring 182, and outer ring 183 are predetermined so as to produce a decrease in heating. In one embodiment, the ring surface area is configured so that the combination of increased rotation speed producing an increase in magnetic variance and a decrease in surface area produces a net decrease in heating of the heat transfer fluid.

Figure 19:
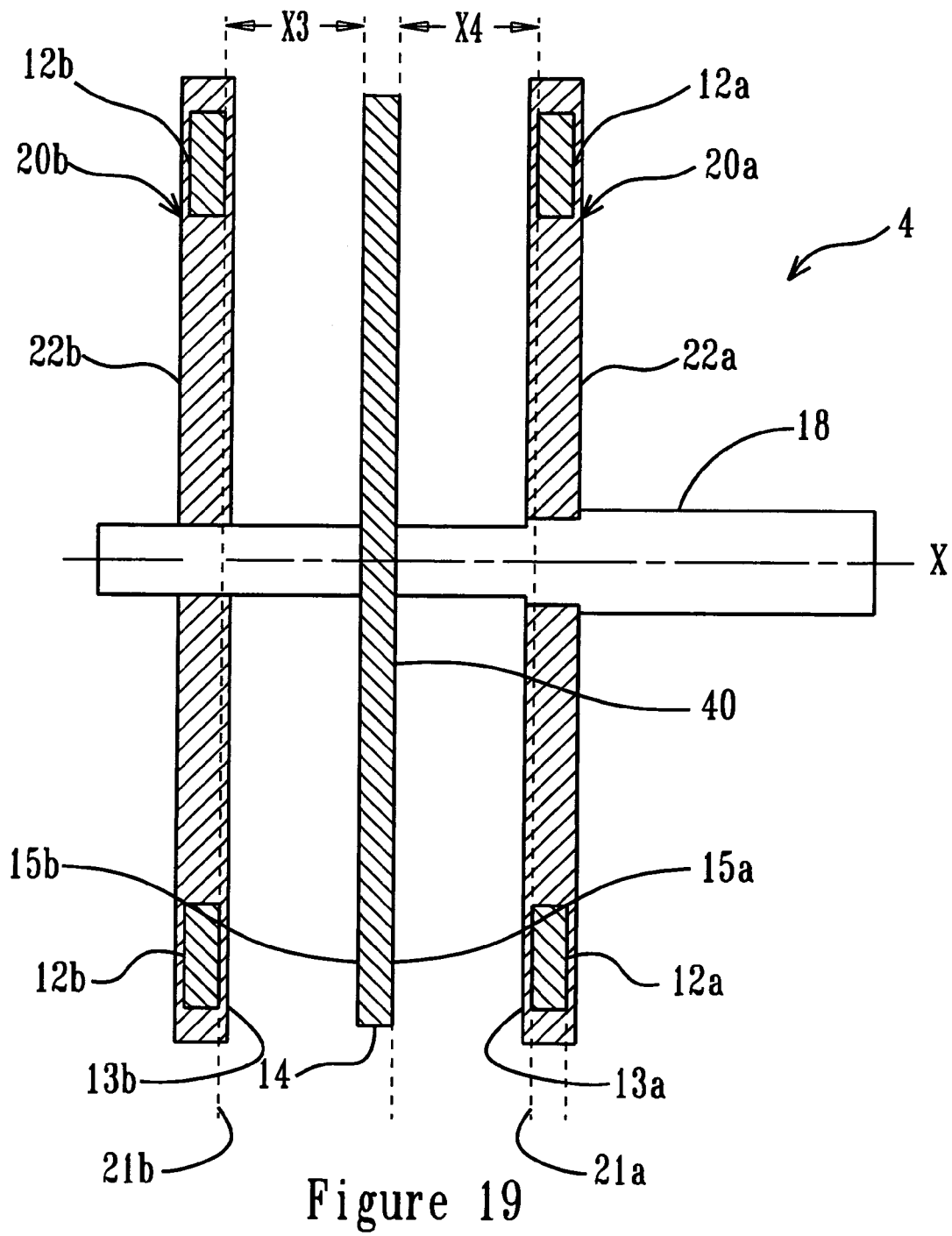
FIG. 19 is a side view of a radially moving magnet relative to a conductive member, in accordance with an embodiment of the present invention.

FIG. 19 is a side view of a magnetic heater 4 in accordance with an embodiment of the present invention. A conductive member 14 comprises a conductive member first side 15a and a conductive member second side 15b. A first magnet assembly 20a comprising a first frame 22a and a plurality of first magnets 12a thereon is disposed a first spacing X3 away from the conductive member first side 15a. Similarly, a second magnet assembly 20b comprising a second frame 22b and a plurality of second magnets 12b thereon is disposed a second spacing X4 away from the conductive member second side 15b of the conductive member 14.

The first and second magnet assemblies 20a, 20b are disposed adjacent the conductive member first and second sides 15a, 15b, respectively, such that the magnets 12a and 12b, respectively, are aligned with one another to form opposing pairs on each side 15a, 15b of the conductive member 14. In an embodiment wherein the first and second magnet assemblies 20a, 20b are movable, they are movable together so as to maintain in opposing magnets pairs.

Figure 20:
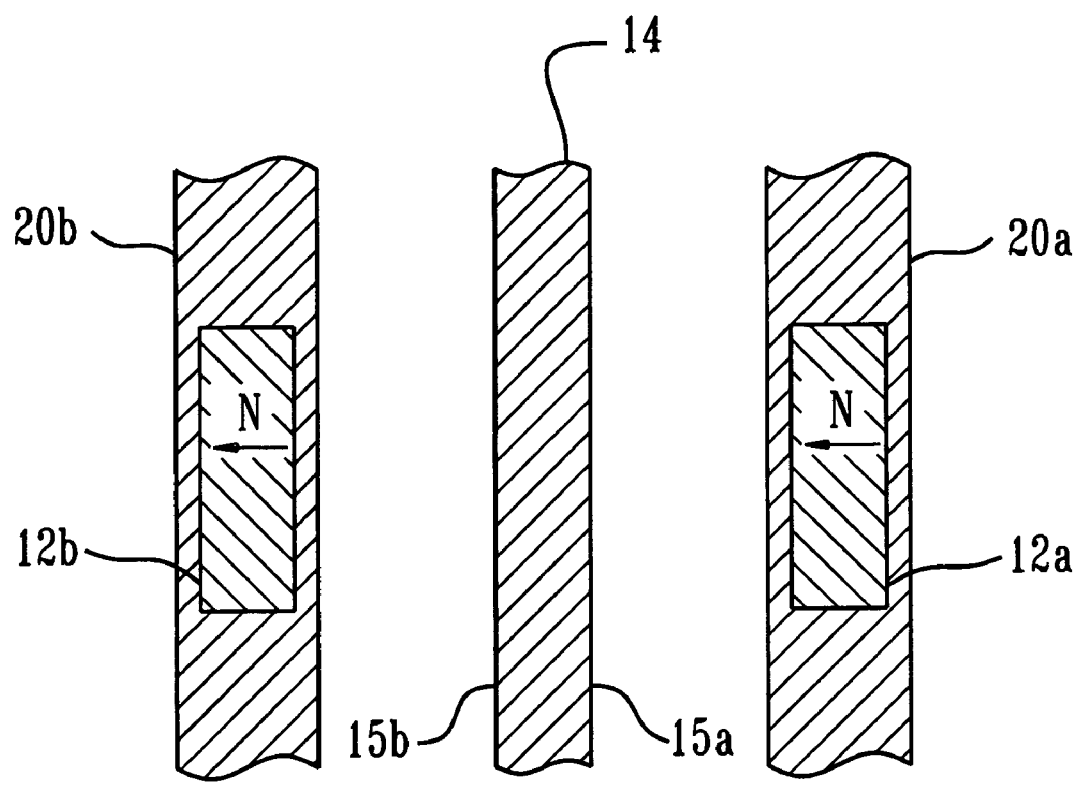
FIG. 20 is a partial view of the embodiment of FIG. 19, wherein different polarities of opposing magnets face the conductive member, in accordance with an embodiment of the present invention.

FIG. 20 is a partial view of the embodiment of FIG. 19, wherein different polarities of opposing magnets 12a, 12b face the conductive member 14, to present a predetermined gradient in the magnetic field. In another embodiment (not shown), the same polarity of opposing magnets 12a, 12b face the conductive member 14, to present a predetermined gradient in the magnetic field that is produced.

Figure 21:
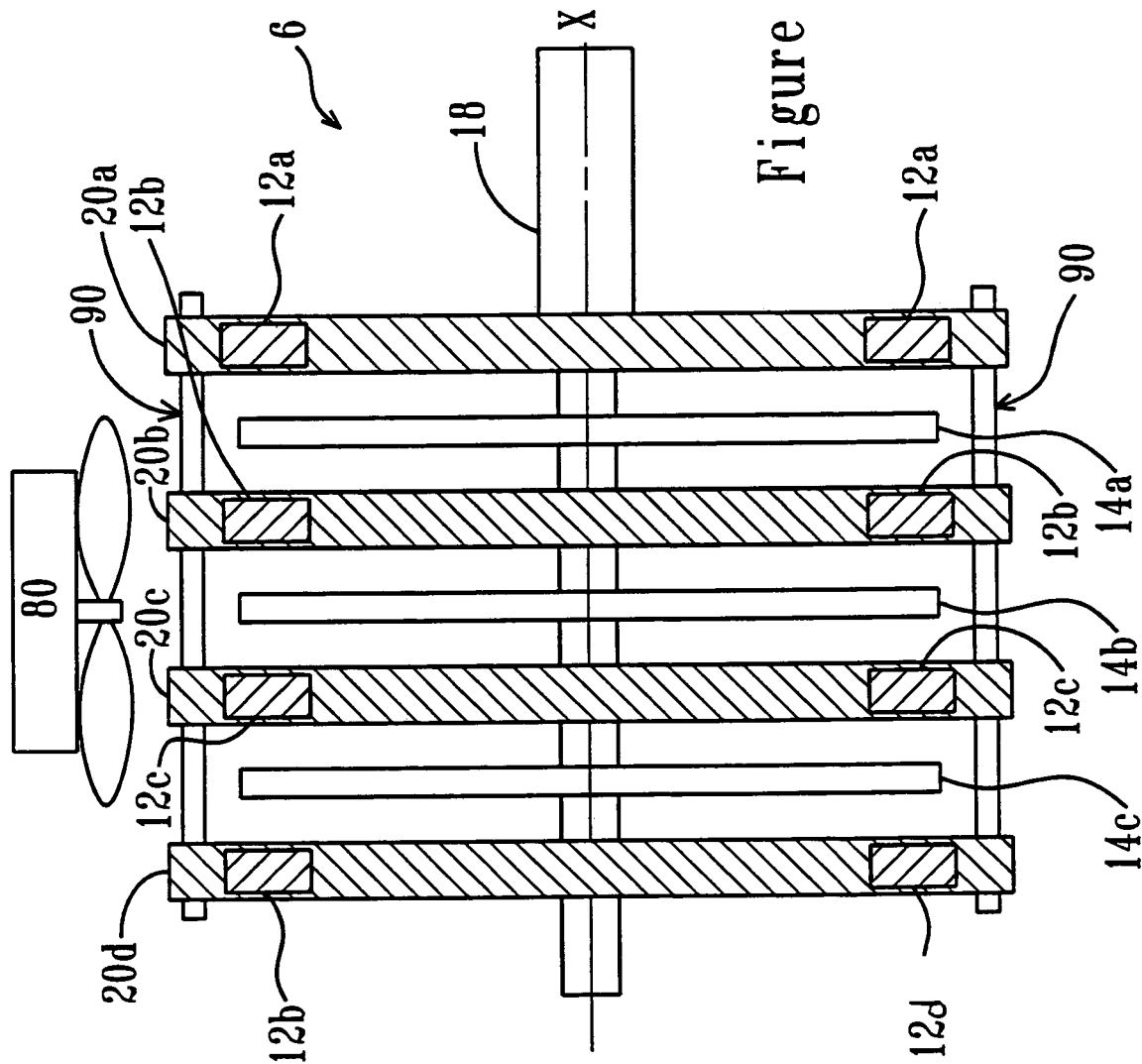
FIG. 21 is a multi-stage magnetic heater, in accordance with an embodiment of the present invention.

FIG. 21 is an embodiment of a multi-stage magnetic heater 6, in accordance with the present invention. As with the embodiment shown in FIG. 1, the embodiment of FIG. 19 may be conveniently expanded by the use of additional conductive members 14 and magnet assemblies 20. The embodiment of FIG. 21 comprises an arrangement with three conductive members 14a-c and four magnet assemblies 20a-d. It is noted that the number of conductive members 14 and magnets 12 is exemplary only, and that other numbers and arrangements may be equally suitable.

The multi-stage magnetic heater 6 further comprises support bracing 90 coupling the plurality of magnet assemblies 20a-d in relative axial alignment. It is appreciated that the operation of the magnetic heater 6 is effected whether the magnet assemblies 14a-d or the conductive members 14a-c are driven to rotation by the shaft 18.

Figure 22:
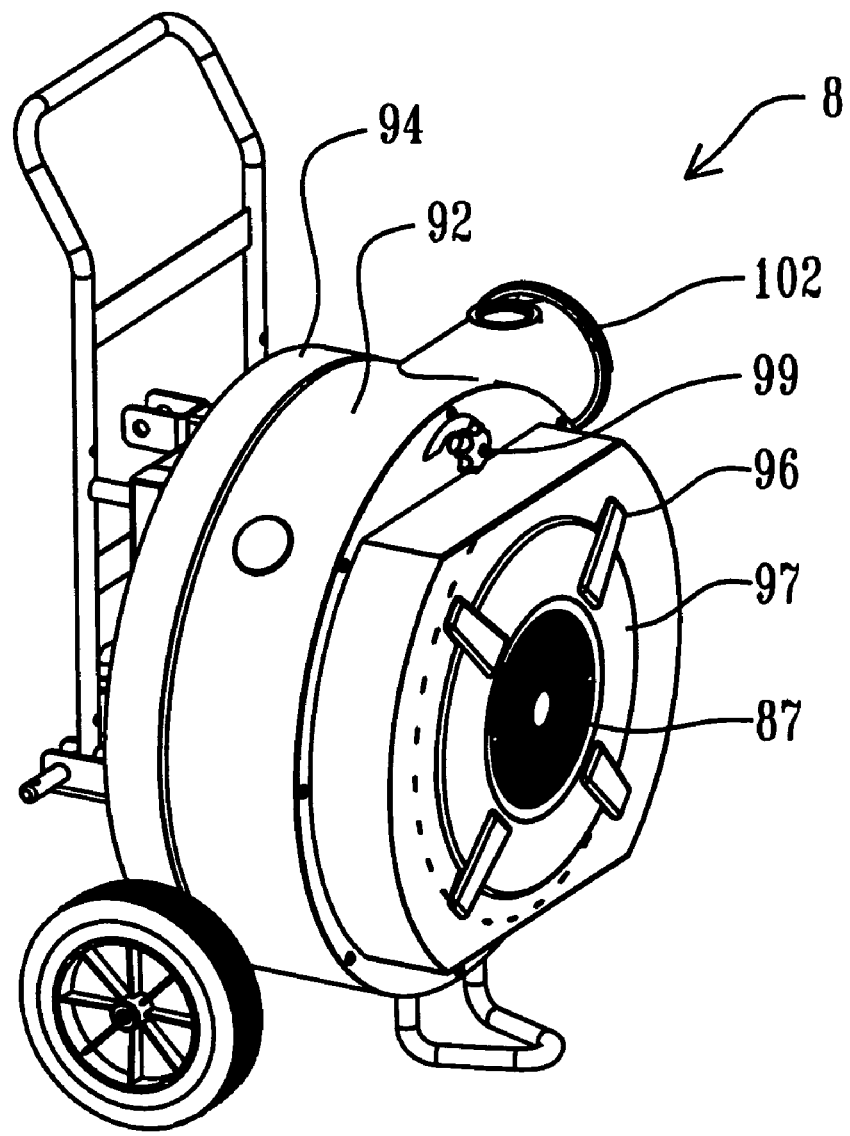
FIG. 22 is a perspective view of a magnetic heater apparatus, in accordance with an embodiment of the present invention.
Figure 23:
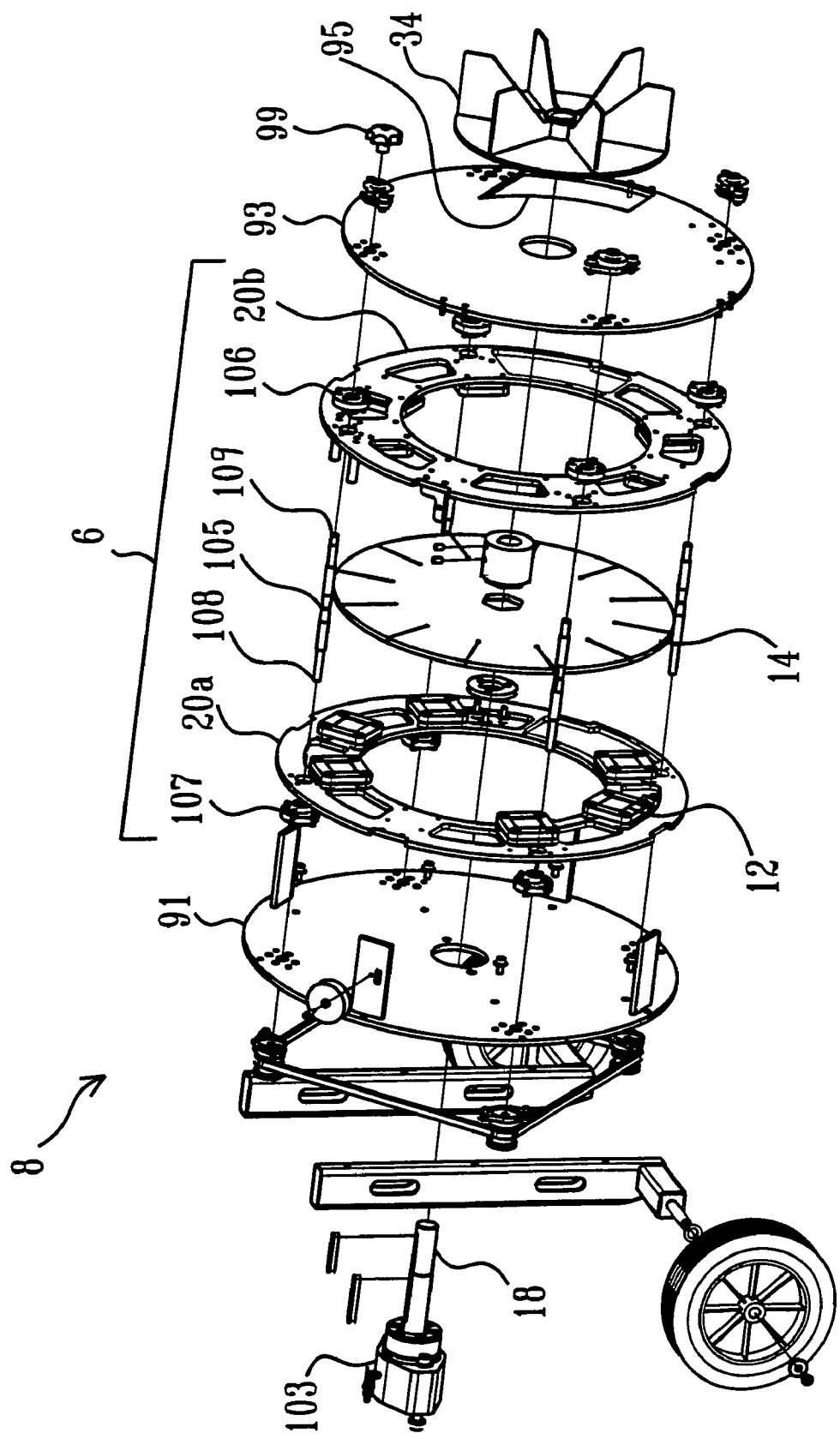
FIG. 23 is an exploded view of the magnetic heater apparatus of FIG. 22.

FIGS. 22 and 23 are assembled and exploded views of a magnetic heater apparatus 8 in accordance with the present invention. The magnetic heater apparatus 8 comprises a rear housing 94, a first end plate 91, a heater housing 92, a magnetic heater 6, a second end plate 93, a blower housing 96, and an air intake screen 97.

The magnetic heater 6, in accordance with the embodiment of FIG. 19, comprises a shaft 18, a first magnet assembly 20a, a conductive member 14, a second magnet assembly 20b and a fluid driver 34. The first and second magnet assemblies 20a, 20b comprise a plurality of magnets 12. The conductive member 14 is disposed between and coaxial with the first and second magnet assemblies 20a, 20b. The conductive member 14 is coupled with the shaft 18 and adapted to rotate with respect to the first and second magnet assemblies 20a, 20b. The shaft 18 is adapted to couple with an energy source 103.

The rear housing 94 is coupled adjacent the first end plate 91, both comprising apertures to allow the shaft 18 to pass there through. The first end plate is coupled adjacent the heater housing 92 defining a volume adapted to contain the first and second magnet assemblies 20a, 20b and conductive member 14. The second end plate 93 is coupled adjacent the heater housing 92 defining a side of the volume. The heater housing 92 comprises a fluid outlet 102. The second end plate 93 comprises a second end plate aperture 95 defining a portion of a fluid path. The fluid driver 34 is coupled to the shaft 18 and located adjacent the second end panel 93 on the opposite side from the second magnet assembly 20b. The blower housing 96 is coupled adjacent the second end panel 93 enclosing the fluid driver 34 there between. The blower housing 96 defines a fluid inlet aperture 87 defining a portion of the fluid path. The air intake screen 97 is coupled to the blower housing 96 covering the fluid inlet aperture 87.

A fluid path is defined by the fluid inlet aperture 87, the fluid driver 34, the second end plate aperture 95, the heater housing 92 and the fluid outlet 102. Fluid is drawn into the fluid inlet aperture 87 by the rotation of the fluid driver 34. The fluid driver 34 directs the fluid through the second end plate aperture 95 and circulates the fluid past the conductive member 14 in the heater housing 92. The heater housing 92 directs the fluid to the fluid outlet 102.

The magnetic heater apparatus 8 further comprises a spacing adjustment assembly 103 comprising a knob 99, a threaded spacer 105 having a first spacer end 108 and a second spacer end 109, a first retention coupler 107 and a second retention coupler 106. The first retention coupler 107 is positioned adjacent the first magnet assembly 20a and the second retention coupler 109 is positioned adjacent the second magnet assembly 20b. The threaded spacer 105 is disposed between the first and second magnet assemblies 20a, 20b, the first spacer end 108 coupled with the first retention coupler 107. The second spacer end 109 is passed through the second retention coupler 106 and coupled to the knob 99. Turning the knob 99 in a first direction reduces the spacing between the first and second magnet assemblies 20a, 20b. Turning the knob 99 in the opposite direction increases the spacing between the first and second magnet assemblies 20a, 20b.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and appended claims contained.

We claim:

1. A magnetic heater, comprising:
   a conductive member having a conductive member first side and a conductive member second side; and
   a first magnet assembly comprising a first frame and at least one magnet movably coupled to the first frame, the at least one magnet disposed a first distance adjacent the conductive member first side, wherein the conductive member and the first magnet assembly are adapted to rotate relative to each other about an axis so as to induce eddy currents in the conductive member when relative motion is produced between the conductive member and the first magnet assembly, the at least one magnet adapted to move relative to the first frame in dependence on the change in the rate of rotation of the first frame, wherein the conductive member comprises a substantially disc-shaped center portion and a plurality of arms extending from the center portion.

2. A magnetic heater, comprising:
   a conductive member having a conductive member first side and a conductive member second side; and
   a first magnet assembly comprising a first frame and at least one magnet movably coupled to the first frame, the at least one magnet disposed a first distance adjacent the conductive member first side, wherein the conductive member and the first magnet assembly are adapted to rotate relative to each other about an axis so as to induce eddy currents in the conductive member when relative motion is produced between the conductive member and the first magnet assembly, the at least one magnet adapted to move relative to the first frame in dependence on the change in the rate of rotation of the first frame, wherein the conductive member comprises a plurality of conductive portions separated by non-conductive portions.

3. A magnetic heater, comprising:
a conductive member having a conductive member first side and a conductive member second side; and
a first magnet assembly comprising a first frame and at least one magnet movably coupled to the first frame, the at least one magnet disposed a first distance adjacent the conductive member first side, wherein the conductive member and the first magnet assembly are adapted to rotate relative to each other about an axis so as to induce eddy currents in the conductive member when relative motion is produced between the conductive member and the first magnet assembly, the at least one magnet adapted to move relative to the first frame in dependence on the change in the rate of rotation of the first frame, wherein the conductive member comprises a plurality of nested rings separated by non-conductive portions.

4. The magnetic heater of claim 3, further comprising:
a fluid path proximate the conductive member, arranged such that heat generated in the conductive member is absorbable by fluid within the fluid path.

5. The magnetic heater of claim 4, further comprising a fluid driver adapted to drive fluid within the fluid path.

6. The magnetic heater of claim 3, further comprising:
a shaft coupled with the magnet assembly adapted to couple with a drive mechanism to rotate the magnet assembly about the axis.

7. A magnetic heater comprising:
a conductive member having a conductive member first side and a conductive member second side;
a first magnet assembly comprising a first frame and at least one magnet movably coupled to the first frame, the at least one magnet disposed a first distance adjacent the conductive member first side, wherein the conductive member and the first magnet assembly are adapted to rotate relative to each other about an axis so as to induce eddy currents in the conductive member when relative motion is produced between the conductive member and the first magnet assembly, the at least one magnet adapted to move relative to the first frame in dependence on the change in the rate of rotation of the first frame; and
a second magnet assembly comprising a second frame and at least one magnet movably coupled to the second frame, the at least one magnet disposed a second distance adjacent the conductive member second side, wherein the second magnet assembly and the second frame are adapted to rotate relative to each other about an axis so as to induce eddy currents in the conductive member when relative motion is produced between the second magnet assembly and the second frame, the at least one magnet adapted to move relative to the second frame in dependence with the rate of rotation of the second frame.

8. The magnetic heater of claim 7, wherein the at least one magnet of the first and second magnet assemblies face each other and rotate in unison with each other.

9. The magnetic heater of claim 7, wherein the first distance and the second distance are equal.

10. The magnetic heater of claim 7, further comprising:
a fluid path proximate the conductive member, arranged such that heat generated in the conductive member is absorbable by fluid within the fluid path.

11. The magnetic heater of claim 10, further comprising a fluid driver adapted to drive fluid within the fluid path.

12. The magnetic heater of claim 10, further comprising:
a shaft coupled with the magnet assembly adapted to couple with a drive mechanism to rotate the magnet assembly about the axis.

13. A magnetic heater apparatus, comprising:
a rear housing;
a first end plate;
a heater housing;
a magnetic heater;
a second end plate; and
a blower housing, the magnetic heater comprising:
a shaft;
a first magnet assembly;
a conductive member;
a second magnet assembly; and
a fluid driver, the first and second magnet assemblies having a plurality of magnets, the conductive member disposed between and coaxial with the first and second magnet assemblies, the conductive member coupled with the shaft and adapted to rotate with respect to the first and second magnet assemblies, the shaft adapted to couple with an energy source, the rear housing coupled adjacent the first end plate and comprising apertures adapted to accept the shaft there through, the first end plate coupled adjacent the heater housing defining a volume adapted to contain the first and second magnet assemblies and conductive member, the second end plate coupled adjacent the heater housing defining a side of the volume, the heater housing comprises a fluid outlet, the second end plate comprises a second end plate aperture defining a portion of a fluid path, the fluid driver coupled to the shaft and located adjacent the second end panel on the opposite side from the second magnet assembly, the blower housing coupled adjacent the second end panel adapted to enclose the fluid driver there between, the blower housing defining a fluid inlet aperture defining a portion of the fluid path, the fluid path defined by the fluid inlet aperture, the fluid driver, the second end plate aperture, the heater housing and the fluid outlet, the first and second magnet assemblies further comprising a frame, and at least one passive relative-positioning actuator adapted to move one or more magnets in at least one of an axial direction and a radial direction relative to the frame, wherein the relative motion is produced in dependence on the change in the rate of rotation of the frame.

14. The magnetic heater apparatus of claim 13, further comprising:
a spacing adjustment assembly comprising:
a knob;
a threaded spacer having a first spacer end and a second spacer end;
a first retention coupler; and
a second retention coupler, the first retention coupler disposed adjacent the first magnet assembly and the second retention coupler disposed adjacent the second magnet assembly, the threaded spacer disposed between the first and second magnet assemblies, the first spacer end coupled with the first retention coupler, the second spacer end disposed through the second retention coupler and coupled to the knob, wherein turning the knob in a first direction reduces the spacing between the first and second magnet assemblies and turning the knob in an opposite direction increases the spacing between the first and second magnet assemblies.

* * * * *